(12) United States Patent
Narahara et al.

(10) Patent No.: US 8,566,785 B2
(45) Date of Patent: Oct. 22, 2013

(54) INFORMATION PROCESSING DEVICE, METHOD OF PROCESSING INFORMATION, AND PROGRAM

(75) Inventors: Tatsuya Narahara, Kanagawa (JP); Atsushi Narita, Tokyo (JP); Kuriko Takeshima, Kanagawa (JP); Norihiro Nagai, Kanagawa (JP); Ryo Takaoka, Tokyo (JP); Ippei Tambata, Kanagawa (JP); Keiichi Yoshioka, Tokyo (JP); Naoyuki Miyada, Tokyo (JP)

(73) Assignee: Sony Corporation, Tokyo (JP)

( * ) Notice: Subject to any disclaimer, the term of this patent is extended or adjusted under 35 U.S.C. 154(b) by 1100 days.

(21) Appl. No.: 11/326,218

(22) Filed: Jan. 5, 2006

(65) Prior Publication Data

US 2006/0179419 A1   Aug. 10, 2006

(30) Foreign Application Priority Data

Jan. 7, 2005 (JP) .................................. 2005-002999

(51) Int. Cl.
*G06F 9/44* (2006.01)
(52) U.S. Cl.
USPC ........... 717/106; 717/107; 717/109; 717/110; 717/113
(58) Field of Classification Search
USPC .......................... 717/106, 107, 109, 110, 113
See application file for complete search history.

(56) References Cited

U.S. PATENT DOCUMENTS

| | | | | |
|---|---|---|---|---|
| 5,280,627 A | * | 1/1994 | Flaherty et al. | 709/222 |
| 5,686,954 A | * | 11/1997 | Yoshinobu et al. | 725/43 |
| 5,815,712 A | * | 9/1998 | Bristor et al. | 717/125 |
| 5,832,271 A | * | 11/1998 | Devanbu | 717/131 |
| 5,963,916 A | | 10/1999 | Kaplan | |
| 5,973,747 A | * | 10/1999 | Goreta | 725/136 |
| 6,118,450 A | * | 9/2000 | Proehl et al. | 709/203 |
| 2002/0113824 A1 | | 8/2002 | Myers, Jr. | |
| 2003/0113100 A1 | | 6/2003 | Hecht et al. | |
| 2003/0135513 A1 | | 7/2003 | Quinn et al. | |

FOREIGN PATENT DOCUMENTS

| | | |
|---|---|---|
| EP | 1 189 437 | 3/2002 |
| EP | 1 511 040 | 3/2005 |
| GB | 2 325 537 | 11/1998 |
| JP | 10 42234 | 2/1998 |
| JP | 2001 313878 | 11/2001 |
| JP | 2003-219298 | 7/2003 |
| WO | WO 02 095611 | 11/2002 |

OTHER PUBLICATIONS

Mitra, et al. "Teaching Software Engineering using a Traceability-Based Development Methodology", 2005, CCSC, p. 249-259.*

(Continued)

*Primary Examiner* — Qamrun Nahar
(74) *Attorney, Agent, or Firm* — Frommer Lawrence & Haug LLP; William S. Frommer

(57) ABSTRACT

An information processing device for providing a program selected on the basis of a predetermined theme among recorded programs and programs to be received to a user. A special program is generated by selecting a predetermined program on the basis of a predetermined theme such as 'person of the today', 'hot drama', among recorded programs and programs to be received to a user and the contents of the selected program is displayed on a screen as information of a recommendation program. The contents of the special program are changed according to preference of the user, a displaying time of the screen, and setting by the user.

11 Claims, 16 Drawing Sheets

(56) References Cited

OTHER PUBLICATIONS

Patent Abstracts of Japan, vol. 2003, No. 12, Dec. 5, 2003 & JP 2004 355340 A (Sony Corp), Dec. 16, 2004, EPO, p. 1.
Patent Abstracts of Japan, vol. 2003, No. 10, Oct. 8, 2003 & JP 2003 173350 A (Rainbow Partner Inc.), Jun. 20, 2003, EPO, p. 1.
Baudisch, P., and Bruechker, L., TV Scout: Lowering the Entry Barrier to Personalized TV Program Recommendation, In Proc. $2^{nd}$ Int. Conf. on Adaptive Hypermedia and Adaptive Web-based Systems, 2002, 8 (in particular, the description of 3. TV Scout) URL:http://ipsi.fhg.de/~baudisch/publications/2002-Baudisch-AH2002-TVScoutLoweringTheEntryBarrier.pdf, p. 1-10.

* cited by examiner

FIG. 7

KEYWORD RANKING SCREEN

NAME OF ORGANIZATION ▽   RANK OF NAMES OF PEOPLE   △ NAME OF PLACE

| | | |
|---|---|---|
| 👑1 | YUKIKO NAKATA | THREE |
| 👑2 | SATOSHI WAHUJI | THREE |
| 👑3 | PARK HANYOUNG | TWO |
| 👑3 | RYOTA SAMURA | TWO |
| 👑3 | SYUNSUKE NAKASAKA | ONE |
| 👑3 | KOJI ISHIHUJI | ONE |
| 👑3 | ERIKA SABATA | ONE |
| 👑3 | RUTA KAWAMA | ONE |

S3-n

INFORMATION PROCESSING DEVICE, METHOD OF PROCESSING INFORMATION, AND PROGRAM

CROSS REFERENCE TO RELATED APPLICATIONS

The present invention contains subject matter related to Japanese Patent Application JP 2005-002999 filed in the Japanese Patent Office on Jan. 7, 2005, the entire contents of which being incorporated herein by reference.

BACKGROUND OF THE INVENTION

1. Field of the Invention

The present invention relates to an information processing device, a method of processing information, and a program. More particularly, the present invention relates to an information processing device capable of providing a program selected on the basis of a predetermined theme among recorded programs and programs to be received to a user, a method of processing information, and a program.

2. Description of the Related Art

A digital recording device such as a hard disk recorder or the like having been sold in recent years has a function for selecting a desired program among recorded programs and presenting the selected program as a recommendation program to a user.

Further, the digital recording device, for example, selects a desired program on the basis of the setting by the user or program information of the recorded program acquired from an EPG (electronic program guide) such that a program of a genre selected by the user or a program having a keyword selected by the user included in a title can be a recommendation program.

In addition, the digital recording device may have a function for analyzing a preference of the user on the basis of an operation history or the like or automatically selecting the recommendation program without depending on the setting by the user. For example, JP-A-2004-355340 discloses a technology for matching a preference vector that indicates preferences of users and a program vector that indicates a feature of each program acquired from program information and for selecting a recommendation program on the basis of the matching result. JP-A-2004-355340 also discloses a technology for displaying the selected recommendation program with a reason of recommendation.

However, the digital recording device according to the related art can select the recommendation program and present it to the user, but the digital recording device displays the title of the corresponding program with the reason of the recommendation by a list. Accordingly, it is hard to induce interesting from the user and the user cannot easily check the reason why the corresponding program is the recommendation program.

The user may easily check the recommendation program by displaying the information of the recommendation program in a form of outlines of a plurality of special articles published in a magazine with photos, like a cover or a list of the magazine, not just a list of the title.

In addition, colors of characters used for the titles of the programs displayed as a list are the same. Accordingly, it is difficult to check or use the titles displayed on one screen.

SUMMARY OF THE INVENTION

An advantage of some examples of the invention is that it provides an information processing device capable of providing a program selected on the basis of a predetermined theme among recorded programs and programs to be received to a user, a method of processing information, and a program.

According to a first embodiment of the invention, an information processing device includes: a generating unit that generates a special program by selecting a predetermined program among recorded programs or programs to be received on the basis of a predetermined theme; and a display control unit that displays a special program screen on which contents of a plurality of different special programs and information of a program selected according to contents of each of the special programs are displayed.

Preferably, the generating unit generates a special program on the basis of a theme selected from a plurality of themes prepared in advance.

Preferably, the generating unit selects a desired theme on the basis of at least one of a preference of a user, a time for displaying the special program screen, or setting by the user.

Preferably, the information processing device further includes a setting unit that sets priority to the special program generated by the generating unit.

Preferably, the setting unit sets a priority to the special program on the basis of at least one of a preference of a user or a time for displaying the special program screen.

Preferably, the display control unit displays the contents of the special program and information of the program in accordance with the priority set by the setting unit.

Preferably, the display control unit displays the contents of the special program and the information of the program by changing fonts, colors, and sizes of characters in accordance with the priority set by the setting unit.

Preferably, the display control unit displays a title of the corresponding program by using characters and displays a program image acquired from the data of the recorded program near the characters when displaying information of the recorded program as information of the corresponding program.

Preferably, the display control unit displays a title of a program to be received next by using characters and displays a program image acquired from data of the recorded program among program series near the characters when displaying program information to be received next among the program series received with a predetermined cycle on the basis of a time for displaying the special program screen.

Preferably, the generating unit changes a theme which is a source of the special program with a predetermined cycle and generates a special program.

Preferably, the display control unit displays the special program screen when it is instructed to apply a power.

According to a second embodiment, a method of processing information includes generating a special program by selecting a predetermined program among recorded programs or programs to be received on the basis of a predetermined theme; and displaying a special program screen on which contents of a plurality of different special programs and information of a program selected according to contents of each of the special programs are displayed.

According to a third embodiment of the invention, a program which allows a computer to execute processes which includes: generating a special program by selecting a predetermined program among recorded programs or programs to be received on the basis of a predetermined theme; and displaying a special program screen on which contents of a plurality of different special programs and information of a program selected according to contents of each of the special programs are displayed.

In the information processing device, the method of processing information, and the program, the special program is generated by selecting the desired program on the basis of a predetermined theme among recorded programs and programs to be received, and a special program screen for displaying contents of a plurality of different special programs and information of the program selected according to the contents of each of the special programs is displayed.

BRIEF DESCRIPTION OF THE DRAWINGS

FIG. 7 is a view showing an example of a keyword ranking screen;

DESCRIPTION OF THE PREFERRED EMBODIMENTS

Hereinafter, preferred embodiments of the invention will be described. The relationships between the invention to be described in the present specification and the embodiments of the invention are as follows. This description is for understanding that the embodiments supporting the invention described in the claims are included in the specification. Therefore, even if there is any embodiment that is included in the description of embodiments of the invention but not described hereinbelow as one corresponding to the invention, it does not mean that the embodiment is not an embodiment that is not corresponding to the above-mentioned invention. On the contrary, even if there is any embodiment that is included in the description of embodiments of the invention as one corresponding to the invention, it does not mean that the embodiment is not corresponding to other invention.

Further, it does not mean that the described embodiments are all of the invention. That is, it is not deny other invention which is described in this specification but not disclosed in an application, that is, the invention which will be added in the future by a divisional application or an amendment.

The information processing device includes the generating unit (for example, a special program searching unit 254 in FIG. 13) which generates a special program by selecting a predetermined program among recorded programs or programs to be received on the basis of a predetermined theme (for example, 'person of the today', 'hot drama') and the display control unit (for example, a display layout processing unit 259 in FIG. 13) which displays a special program screen (for example, a special program/keyword table screen S2 in FIG. 5) in which contents of a plurality of different special programs and information (for example, common special keyword in the program, title of the program, or the like) of a program selected according to contents of each of special programs are displayed.

Figure 13:
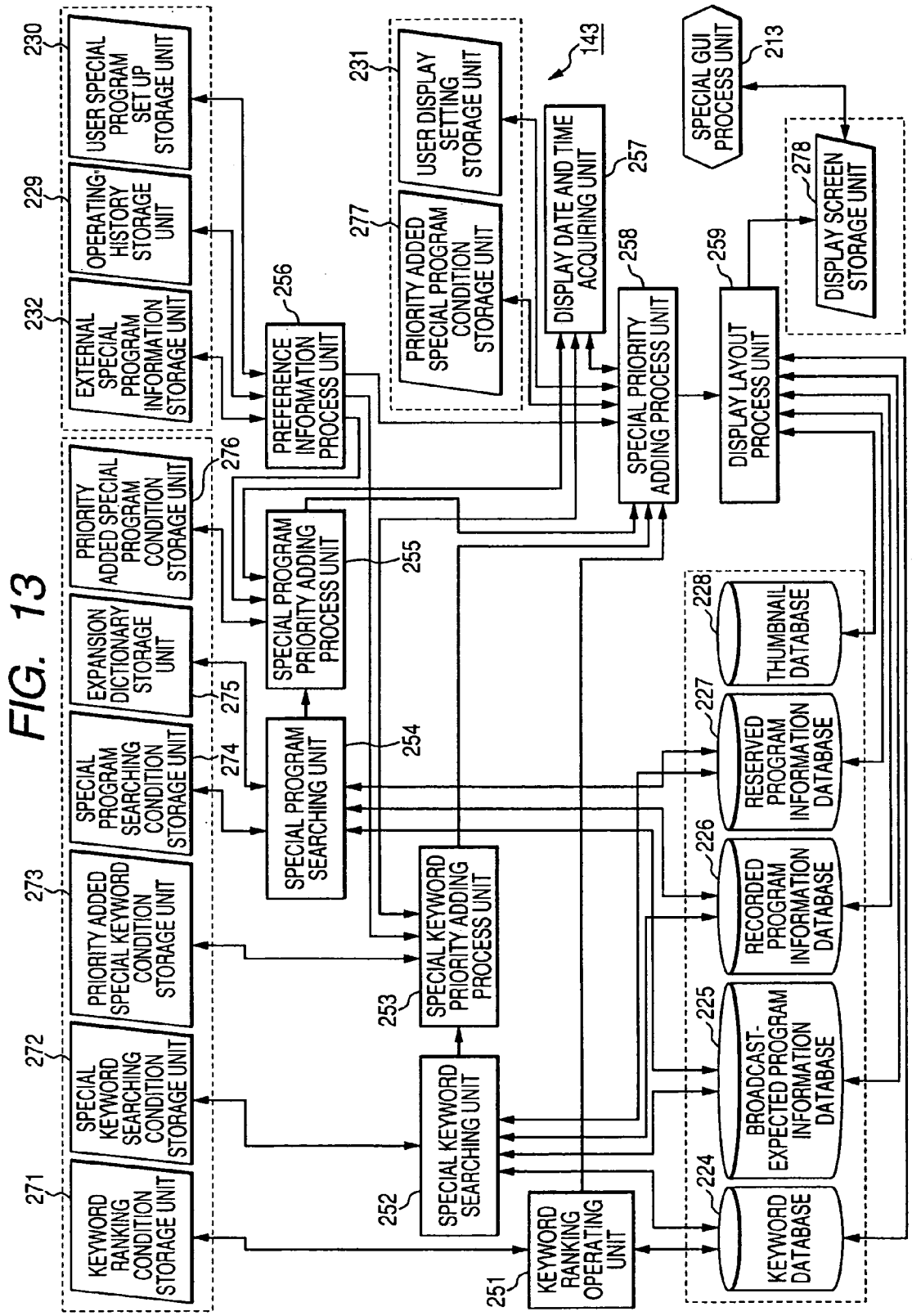
FIG. 13 is a block diagram showing an example of configuration of the screen generation displaying process unit of FIG. 11.

The information processing device further includes the setting unit (for example, a special program priority adding process unit 255 in FIG. 13) which sets priority for the special program generated by the generating unit.

An information processing method includes: generating a special program (for example, step S33 in FIG. 16) by selecting a predetermined program among recorded programs or programs to be received on the basis of a predetermined theme (for example, 'person of the today', 'hot drama'), and controlling display (for example, step S4 in FIG. 14) of a special program screen (for example, a special program/keyword table screen S2 in FIG. 5) in which contents of a plurality of different special programs and information (for example, common special keyword in the program, title of the program, or the like) of a program selected according to contents of each of special programs are displayed.

The program allows a computer to generate a special program (for example, step S33 in FIG. 16) by selecting a predetermined program among recorded programs or programs to be received on the basis of a predetermined theme (for example, 'person of the today', 'hot drama'), and control display (for example, step S4 in FIG. 14) of a special program screen (for example, a special program/keyword table screen S2 in FIG. 5) in which contents of a plurality of different special programs and information (for example, common special keyword in the program, title of the program, or the like) of a program selected according to contents of each of special programs are displayed.

Hereinafter, the embodiments of the invention will be described with reference to the accompanying drawings.

Figure 1:
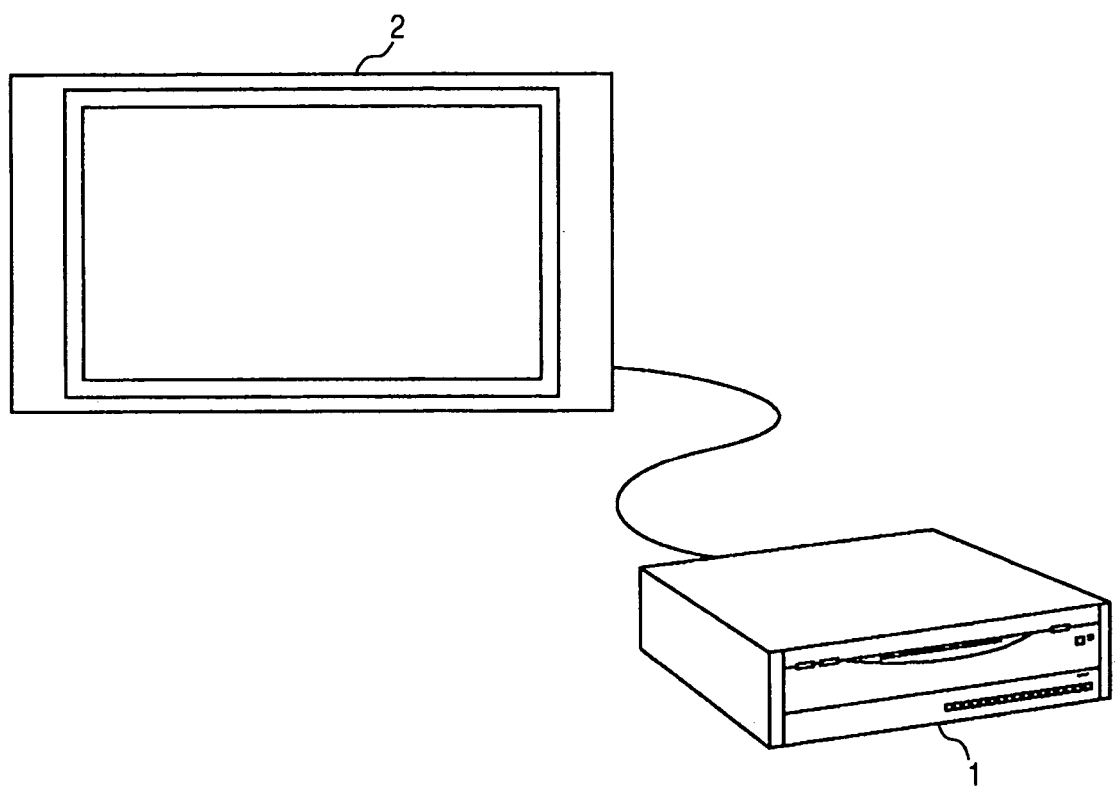
FIG. 1 is a view showing examples of external appearances of an information processing device according to an embodiment of the invention and a television receiver connected to the information processing device.

FIG. 1 is a view showing examples of external appearances of an information processing device 1 and a television receiver 2 (hereinafter, referred as to TV 2) connected to the information processing device 1 through a cable according to an embodiment of the invention.

The information processing device 1 is a digital recording device having a built-in HDD (hard disk drive). The information processing device 1 acquires data of a program from broadcast waves received through an antenna (not shown) and stores the acquired program data in the HDD (record the program).

The information processing device 1 has a function for acquiring a broadcasted EPG (electronic program guide) or acquiring an EPG by downloading it from a predetermined server connected through the Internet. The EPG includes program information such as a title, a genre, a broadcasting date and time, performers, a synopsis, or the like for each of programs.

The information processing device 1 having these functions generates a special program by selecting a predetermined program corresponding to a predetermined theme on the basis of the theme such as, for example, 'person of the today' or 'hot drama' from recorded programs or programs to be received. Contents of the special program are displayed on the TV 2 as information of a recommendation program. Each of program information may be referred to when selecting a program.

As described with reference to the drawing below, the screen, which displays the special program, displays the contents of a plurality of different special programs, such as 'person of the today' or 'hot drama', and displays the information such as a title or a keyword of the selected program (hereinafter, referred to as special program) according to the contents of each of the special programs.

As such, a program is selected on the basis of a predetermined theme. A selected predetermined program among the recorded program or the program to be received is displayed as the recommendation program. It is possible to collectively understand the outline at a glance as a list of a magazine as compared with a case of simply displaying a list of program titles by dynamically displaying the program. Accordingly, a user can easily check the program with fun.

The contents of the special program can be changed according to a predetermined time, for example, a day, a preference of the user, or display time of the screen. Therefore, the user can confirm a different special program according to the predetermined time whenever the contents of the special program are changed.

The operation of the information processing device 1, which generates the special program and displays the contents thereof, will now be described with reference to a flowchart. Hereinafter, the screen on which the contents of the special program or the like are displayed is referred as to a special program/keyword table screen.

Figure 2:
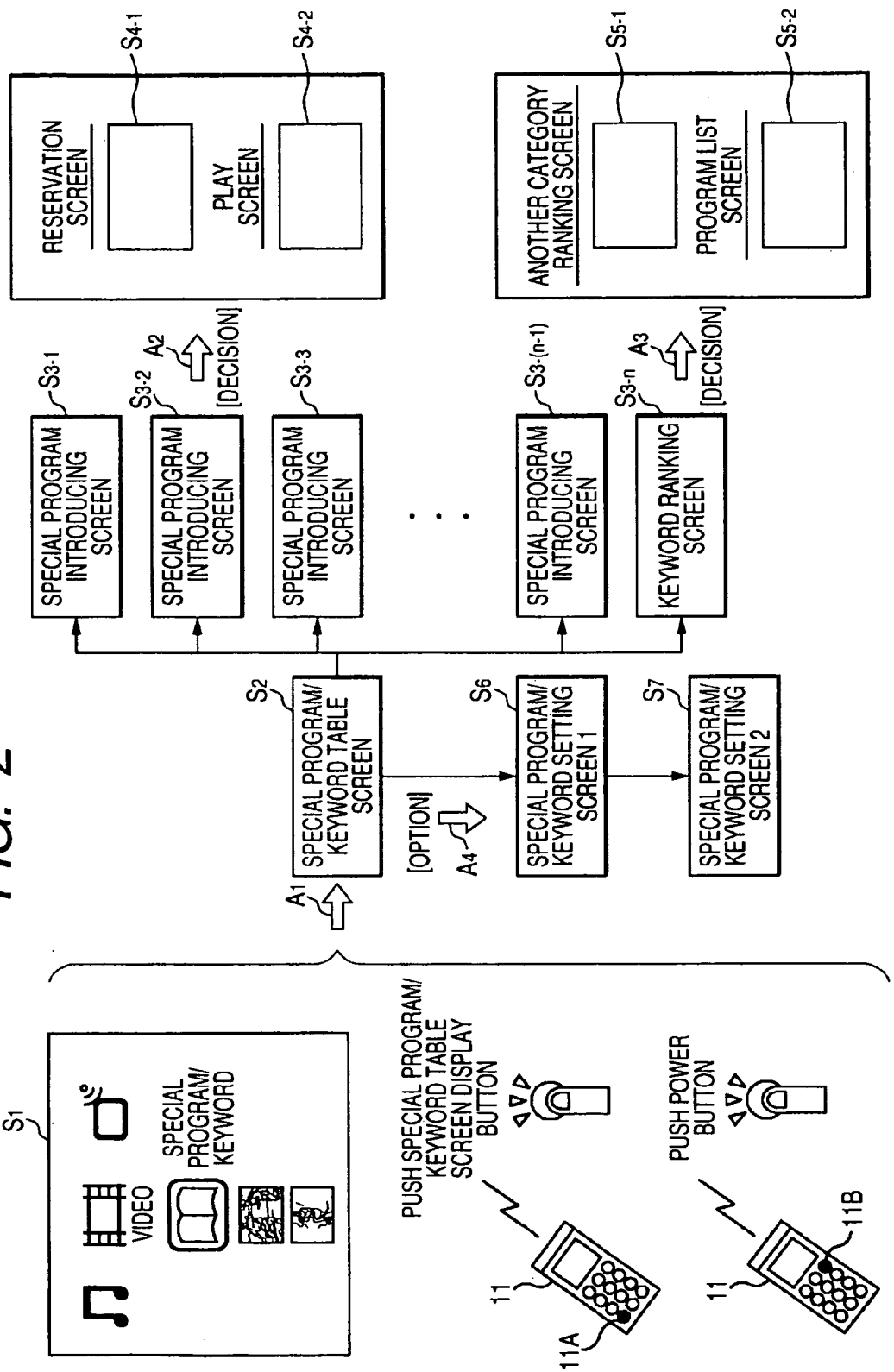
FIG. 2 is a view showing an example of a change of a screen displayed by the information processing device.

FIG. 2 is a view showing an example of changes of the screens displayed on the TV 2 by means of the information processing device 1. Each of the screens shown in FIG. 2 will be described in detail below with reference to the drawing.

Various operations using the information processing device 1 is basically performed on a menu screen S1 by a remote controller.

The menu screen S1 displays icons selected when the special program/keyword table screen display is instructed. When one icon is selected, the menu screen S1 is changed to a special program/keyword table screen S2 so as to be displayed on the TV2, as shown in front of an outline arrow A1.

As shown in FIG. 2, when a screen display button 11A or a power button 11B provided in the remote controller 11 is pushed down, the special program/keyword table screen S2 may be displayed.

In a case that it takes a time to perform a process for playing the recorded program after the power is supplied, when the power button 11B is pushed down, the special program/keyword table screen S2 is displayed on the TV 2, so that the user can enjoy the time necessary for various operations without boredom. In addition, even when the power button 11B is pushed down but the corresponding operation is not performed, the special program/keyword table screen S2 may be automatically displayed for a predetermined time and then a screen of a program, which is being broadcasted, may be displayed on the TV 2.

The special program/keyword table screen S2 displays information, such as contents of the special program, a title of the special program or the like. The user can display special program introducing screens S3-1 to S3-($n$–1) which introduce the respective special programs from the special program/keyword table screen S2. The special program introducing screens S3-1 to S3-($n$–1) display details of the outlines of the respective special programs, information of other programs related to the respective special programs or the like.

In addition, if the special program to be introduced is a program to be broadcasted, the special program introducing screens S3-1 to S3-($n$–1) also display a record reservation button operated when setting a record reservation of the special program to be broadcasted. If the special program to be introduced is a recorded program, the special program introducing screens S3-1 to S3($n$–1) also display a play button operated when starting playing the recorded special program.

When the record reservation button is operated, as shown in front of an outline arrow A2, the special program introducing screens S3-1 to S3-($n$–1) changes to a reservation screen S4-1 in the TV 2. The user can confirm detailed information of the record reservation setting, such as a time to start to record the special program, a broadcasting channel, or the like, from the reservation screen S4-1.

When the play button is operated, as shown in front of the outline arrow A2, the special program introducing screens S3-1 to S3-($n$–1) change to a play screen S4-2 in the TV 2. The user can watch the recorded special program by the display of the play screen S4-2.

In addition, the special program/keyword table screen S2 may display ranking of keywords extracted from the program information of the recorded program or the program to be broadcasted as one of the special programs. If the user instructs to display the ranking of the keywords, the special program/keyword table screen S2 changes to a keyword ranking screen S3-$n$ in the TV2.

If the user instructs to display ranking of a category different from the category being displayed in the keyword ranking screen S3-$n$, as shown in front of an outline arrow A3, the keyword ranking screen S3-$n$ changes to anther category ranking screen S5-1 in the TV 2.

On the other hand, if a predetermined keyword is selected from the keywords included in the ranking, as shown in front of the outline arrow A3, the keyword ranking screen S3-$n$ changes to a program list screen S5-2 which shows a program list related to the selected keyword in the TV 2.

A setting screen for setting each of operations may be displayed by performing a predetermined operation (by instructing an option) at the special program/keyword table screen S2.

If the option is instructed, as shown in front of an outline arrow A4, the special program/keyword table screen S2 changes to a setting screen S6 (special program/keyword setting screen 1) or a setting screen S7 (special program/keyword setting screen 2) in TV 2. For example, the user can select a genre of a desired program to put on the special program/keyword table screen S2 from the setting screen S6 as the special program. The user can also select a watching mode from the setting screen S7. As described below, the contents of the special program being displayed on the special program/keyword table screen S2 may be properly changed by the watching mode set by the user.

Next, each of screens of FIG. 2 will be described in detail.

Figure 3:
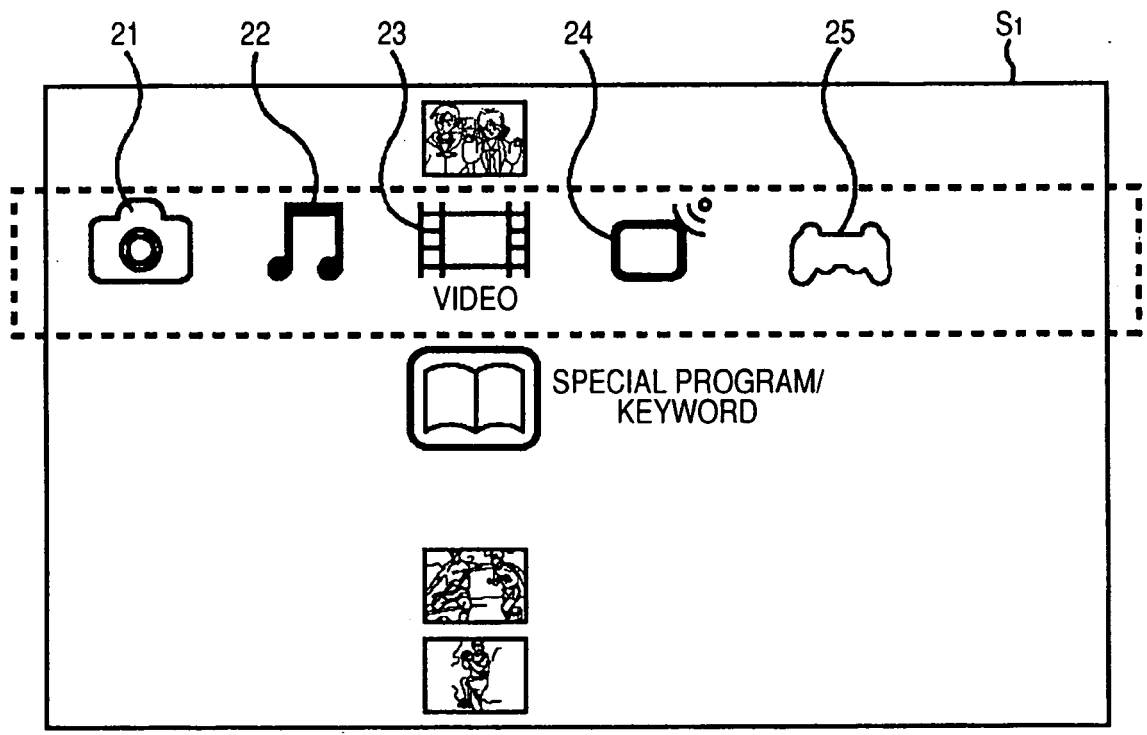
FIG. 3 is a view showing an example of a menu screen.
Figure 4:
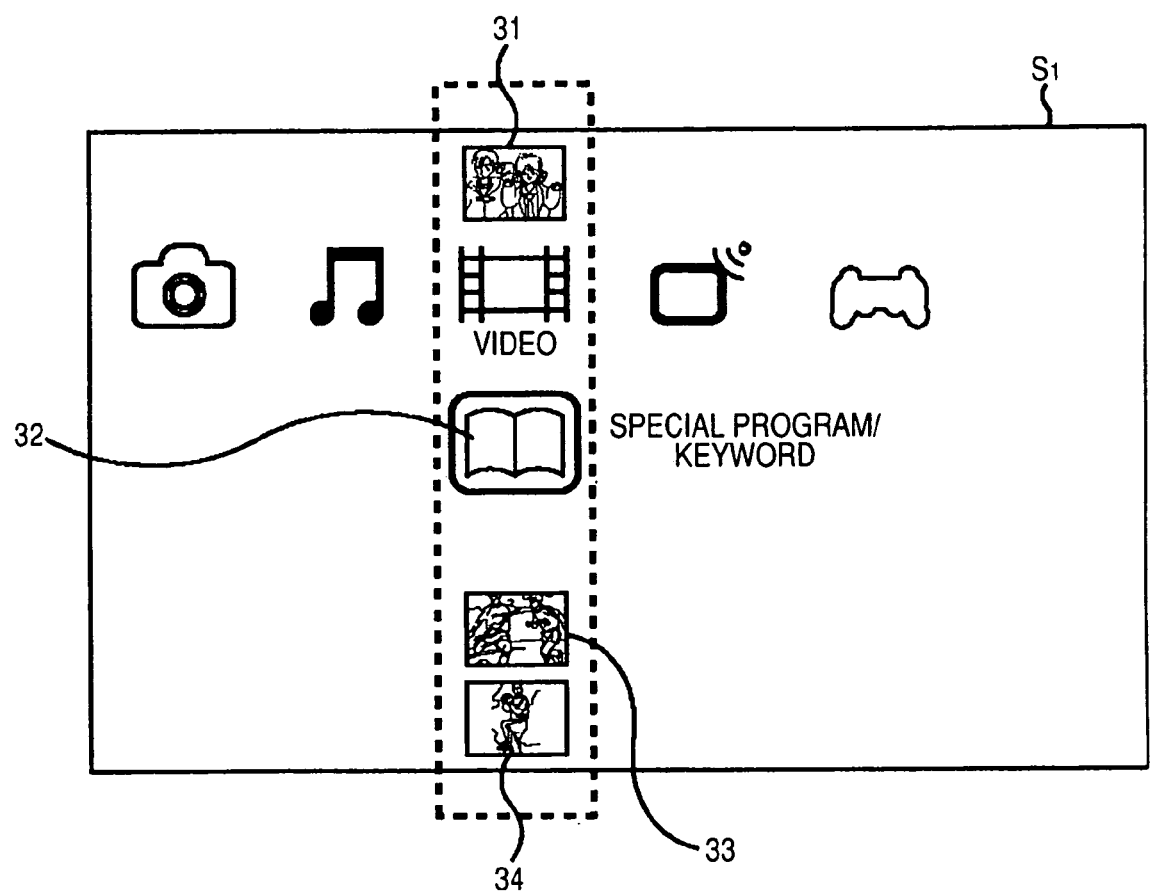
FIG. 4 is a view showing an example of a menu screen.

FIGS. 3 and 4 are views illustrating an example of the menu screen S1 of FIG. 2.

In the menu screen S1, as shown by a dot line in FIG. 3, category icons 21 to 25 displaying each of categories are arranged in a horizontal direction of the screen. In addition, as shown by a dot line in FIG. 4, content icons (video contents icons 31 to 34) displaying contents included in the predetermined categories selected by the user are arranged in a vertical direction so as to cross an arrangement direction of the category icons 21 to 25. In addition, dot lines of FIGS. 3 and 4 are for convenience of the description and not actually shown in the menu screen S1.

In the example of FIGS. 3 and 4, the category icon 21 which displays a 'photo' category, the category icon 22 which displays a 'music' category, the category icon 23 which displays a 'video' category, the category icon 24 which displays a 'television' category, and the category icon 25 which displays a 'game' category are displayed in a horizontal direction on the screen.

That is, the information processing device 1 has a 'photo' function selected when playing an image (still image) loaded from a digital camera or the like, a 'music' function selected when playing the music stored in built-in HDD and a 'game' function selected when operating a game, in addition to a 'video' function selected when performing an operation, such as playing a recorded program, or the like, corresponding to a record of a program and a 'television' function selected when watching a program being broadcasted.

In FIGS. 3 and 4, if the user selects the 'video', the content icons 31 to 34 which display video contents included in the 'video' are displayed in a vertical direction.

An icon currently selected among the content icons 31 to 34 is the content icon 32 selected when displaying the special program/keyword table screen. A character 'special program/keyword' is displayed near the content icon 32.

Basically, the user can select a desired category by operating a remote controller in a horizontal direction (left and right buttons) in the menu screen S1, and can select desired contents included in the selected category by operating the remote controller in a vertical direction (up and down buttons).

According to the operation of the user, all of the category icons 21 to 25 (category icons 21 to 25 and other category icons displaying categories not shown in FIGS. 3 and 4) and the content icons 31 to 34 (content icons 31 to 34 and other content icons not shown in FIGS. 3 and 4) are moved and displayed as one group.

For example, in a state of FIG. 3 in which the 'video' is selected, if the user pushes a left button once, the category icons 21 to 25 moves to the right as one group, a category icon 22 is displayed in the position where the category icon 23 is displayed now, and the category icon 21 will be displayed in the position where the category icon 22 is displayed.

In the same manner, the category icon 23 will be displayed in the position where the category icon 24 is displayed and the category icon 24 will be displayed in a position where the category icon 25 is displayed. In the position where the category icon 21 is displayed now, another category icon, which is arranged at the left side of the category icon 21 and not shown in FIGS. 3 and 4, will be displayed.

Accordingly, the 'music' is selected instead of the 'video' and the content icons displaying audio contents included in the 'music' are aligned and displayed in a vertical direction.

On the other hand, if the user pushes a right button once in the state of FIG. 3, the category icons 21 to 25 move to the left side as one group, which is opposite to the case where the user pushes a left button, and the 'television' is selected.

In addition, for example, in the state of FIG. 3 where the content icons 31 to 34 are displayed, when the user pushes an upward button once, all of the content icons 31 to 34 move upward. In the position where the content icon 31 is displayed now, the content icon 32 will be displayed, and in the position where the content icon 32 is displayed now, the content icon 33 will be displayed.

In the same way, in the position where the content icon 33 is displayed now, the content icon 34 will be displayed, and in the position where the content icon 34 is displayed now, a content icon, which is arranged right below the category icon 34 and not shown in FIGS. 3 and 4, will be displayed.

Accordingly, the state that the content icon 32 is selected changes to the state that the content icon 33 is selected. At this time, a title of the video contents being displayed by the content icon 33 will be displayed near the content icon 33.

In contrast, if the user pushes the downward button once in the state of FIG. 3, in opposition to the case pushing the upward button, all of the content icons 31 to 34 move to a downward direction and the content icon 31 is selected.

In this way, by selecting the desired category and contents and operating a decision button in the remote controller 11, the user can display a menu (sub-menu) of operation capable of being performed so as to correspond to the selected contents. The user can play, copy, edit, delete, or the like the selected contents from the sub-menu displayed when the user selected the contents.

Figure 5:
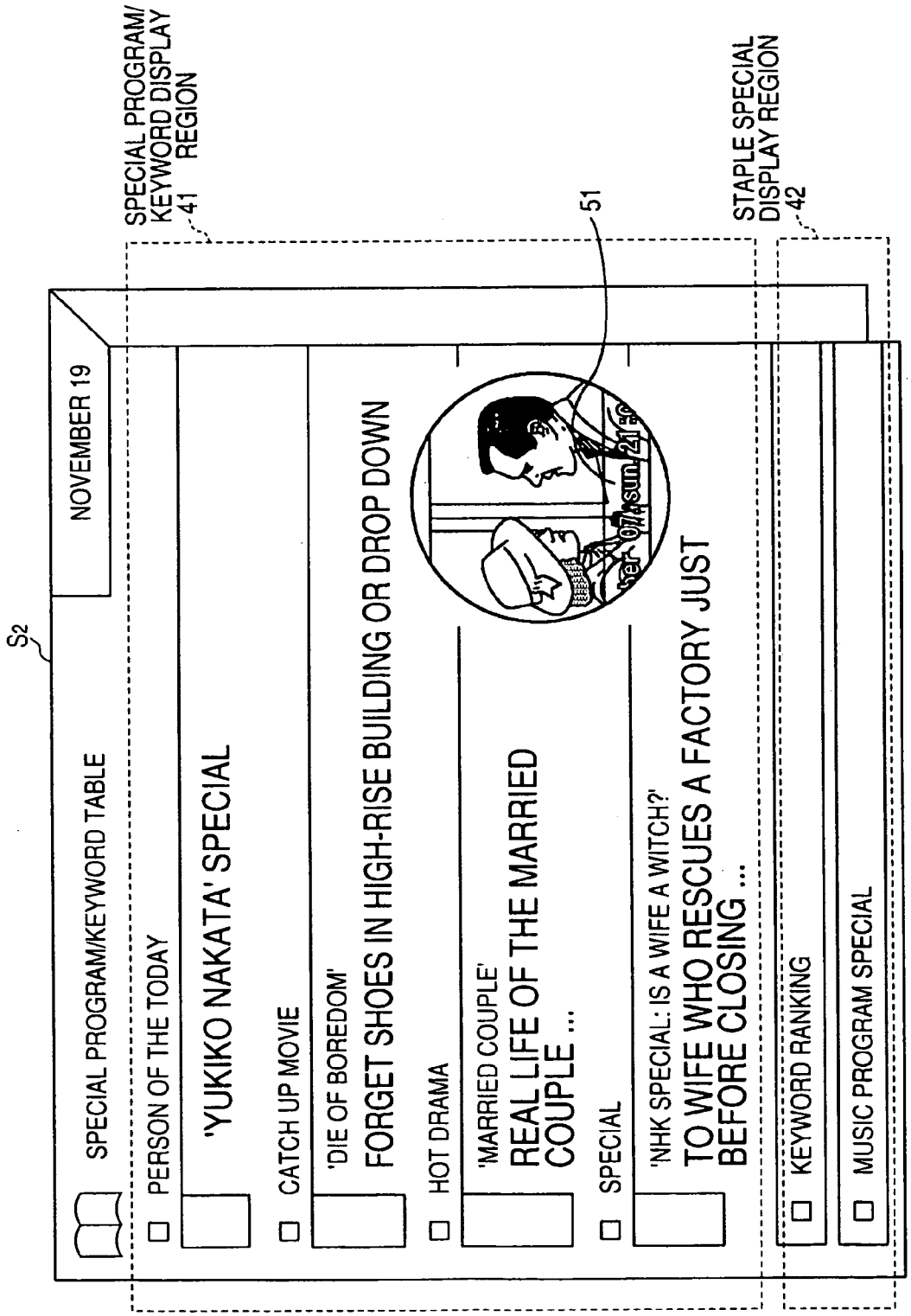
FIG. 5 is a view showing an example of a special program/keyword table screen.

FIG. 5 is a view showing an example of the special program/keyword table screen S2 of FIG. 2.

The special program/keyword table screen S2, as shown by the dot line, has a special program/keyword display region 41 and a staple special display region 42. The special program/keyword display region 41 displays contents and information of the special program, and the staple special display region 42 displays contents of the staple special program.

In an example of FIG. 5, the special program/keyword display region 41 displays contents of four special programs such as 'person of the today', 'catch up movie', 'hot drama' and 'special'.

The contents of the special program, as described above, are selected according to the preference of the user, the display time of the special program/keyword table screen S2, setting by the user, or the like. For example, if the user likes a movie or a drama, the 'catch up movie' and the 'hot drama' are selected. In a season when a lot of special programs such as programs of two hours or three hours are broadcasted in a predetermined season, for example, at the end of the year, the 'special' is selected.

In addition, an order of the respective special programs in the special program/keyword table screen S2 is in accordance with a high priority set by a preference of the user corresponding to each of the special programs.

In FIG. 5, "Yukiko Nakata' special' is displayed as the special program of 'person of the today'. 'Yukiko Nakata' is a name of a person who is the most famous in the players of the recorded program and the players of the program to be broadcasted.

The user selects a special of the 'person of the today' by operating the remote controller 11 or the like, and may check the details of the special program, that is, the details of the "Yukiko Nakata' special' in FIG. 5. When the user selects the 'person of the today', the special program/keyword table screen S2 changes to a screen (special program introducing screen) which shows a program list that the 'Yukiko Nakata' appears, on the TV 2.

The special of 'catch up movie' is displayed under the special of the 'person of the today' and 'die of boredom' (movie) is displayed as a title of the special program selected according to contents of the special. The outline of the program 'forget shoes in a high-rise building or drop down' is displayed under the title. Accordingly, the user can understand the outline with the contents or the title of the special.

For example, the 'die of boredom' is a recorded program which includes information indicating that the program is a movie in the program information. Also, the 'die of boredom' is a movie selected on the basis of the preference of the user among the programs to be received. Further, the outline of the program is displayed on the basis of the program information.

The user can check the details of the 'die of the boredom' by selecting 'catch up movie' special from this display (display a special program introducing screen).

The 'hot drama' is displayed under the 'catch up movie' special, and a 'married couple' (drama) is displayed as a title of the special program selected according to the contents of the special program. The outline of the program 'real state of the married couple . . . ' is displayed under the title.

The 'married couple', for example, is a drama selected from programs whose records are finished. In the recorded program, a thumbnail 51 showing one scene of the corresponding program is displayed near characters indicating the title or the outline of the program. The thumbnail 51 is displayed on the basis of data acquired from data of the recorded program. The data is stored in the HDD.

In a case in which the program presented to the user as the special program is not the recorded program but the program reserved so as to be recorded repeatedly at predetermined time of the predetermined day, a thumbnail displaying one scene of the program is displayed near the character indicating the title or the outline of the program as information of the program to be received next in the same manner as the program to be received next on the basis of a display time of the special program/keyword table screen S2. At this time, for example, data for displaying the thumbnail is acquired from the previously received data of the same program previously recorded according to a repeated reservation.

As such, the user can immediately understand the contents of the program by displaying the thumbnail as well as the characters.

Through theses displays, the user can understand the details of the 'married couple' by selecting the 'hot drama' special.

The 'special' is displayed under the 'hot drama' special, and 'NHK special: is a wife a witch?' is displayed as a title of the special program selected according to the contents of the special. The outline of the program 'To a wife who rescues a factory just before closing . . . ' is displayed under the title.

The 'NHK special: is a wife a witch?' is, for example, a recorded program including information indicating that the program is a special program in the program information or a special program selected on the basis of the preference of the user or the like from the programs to be received.

The staple special display region 42 provided under the special program/keyword display region 41 displaying the information displays two special contents such as 'keyword ranking' and 'music program special'. The two specials are always displayed on the special program/keyword table screen S2 without updating the contents according to the preference of the user or the like.

The user can display the keyword ranking screen (keyword ranking screen S3-*n* of FIG. 2) of the keywords extracted from the program information of the recorded program and the program to be received by selecting the special 'keyword ranking'. In addition, the user can display a program list screen including information which indicates that the genre of this program is the music in the program information by selecting the 'music program special'.

The contents of the staple special displayed in the staple special display region 42 may be selected by a user instead of the two special contents of FIG. 5.

Figure 6:
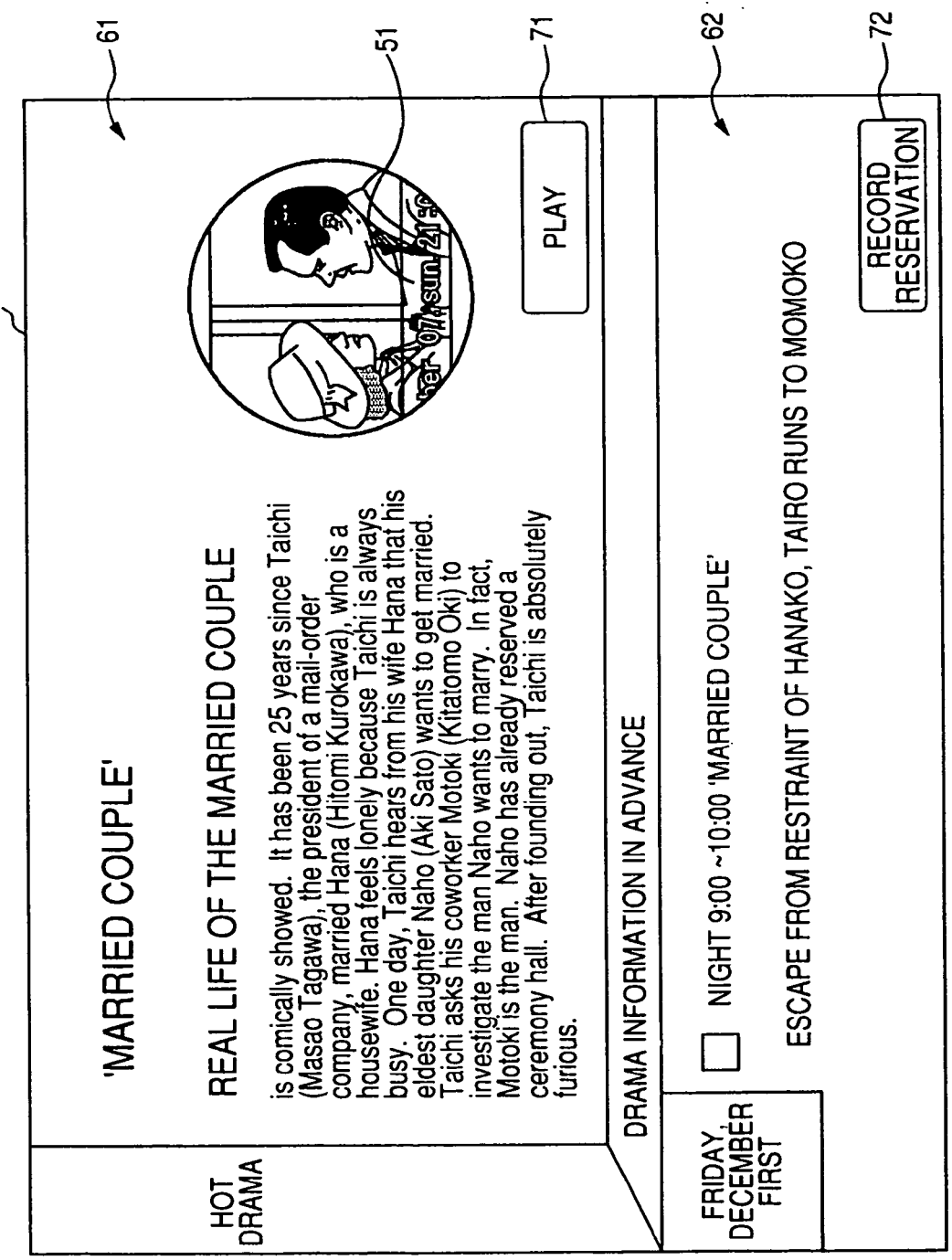
FIG. 6 is a view showing an example of a special program introducing screen.

FIG. 6 is a view showing an example of the special program introducing screen S3-1 of FIG. 2 displayed when the 'hot drama' special is selected from the special program/keyword table screen S2 of FIG. 5.

The special program introducing screen S3-1 has a region 61 and a region 62. The region 61 displays information of the special program. The region 62 displays information of a program related to the special program.

In the example of FIG. 6, the region 61 displays the outline of the special program 'married couple' and the thumbnail 51 which is the same as the thumbnail displayed in the special program/keyword table screen S2 of FIG. 5.

In addition, the region 61 displays a play button 71 operated when the play of the 'married couple' is instructed. As described above, the special program 'married couple' displayed in the region 61 of FIG. 5 is a recorded program. The user can watch the 'married couple' that is the recorded program by operating the play button 71 (display the play screen S4-2 of FIG. 2).

On the other hand, the region 62 displays an outline and a transmitting time of a next transmitting part of the 'married couple' (next (December 1) transmitting part on the basis of a displaying time of the special program/keyword table screen S2) as advance information of a program related to the special program. In this example, the 'married couple' is a series drama being transmitted at a predetermined time of a predetermined day.

In addition, the region 62 displays a record reservation button 72 operated when setting a record reservation for the next transmitting part. The user can set the record reservation for the next transmitting part and check the details of the setting (display the reservation screen S4-1 of FIG. 2) by operating the record reservation button 72.

FIG. 7 is a view showing an example of the keyword ranking screen S3-*n* of FIG. 2 displayed when selecting the special program of the 'keyword ranking' from the special program/keyword table screen S2 of FIG. 5.

The category of the ranking displayed on the keyword ranking screen S3-*n* of FIG. 7 is a 'name of person'. There are 'Yukiko Nakata', 'Santoshi Wahuji', and the like in the ranking. The names in the ranking, for example, indicate the people who appear on many programs among the players of the recorded program and the program to be received.

The user selects a predetermined name from the names of people in the ranking such that the user can display a list (program list screen S5-2 of FIG. 2) of the programs in which the corresponding person appears.

In the example of FIG. 7, the category of the ranking to be displayed can be changed from the 'names of people' to other categories such as 'organization name', 'name of place' or the like. For example, when the 'organization name' is selected as a category of the ranking, instead of the keyword ranking screen S3-*n*, the ranking of the organization name (another category ranking screen S5-1 of FIG. 2) is displayed on the TV 2.

Figure 8:
FIG. 8 is a view showing an example of a special program/keyword setting screen 1.

FIG. 8 is a view showing an example of the setting screen S6 of FIG. 2 displayed when one option is instructed from the special program/keyword table screen S2 of FIG. 5.

The setting screen S6 displays genres of the programs such as 'drama', 'variety', 'documentary', and so on. The user can select a desired program genre to want to include it in the special program/keyword table screen S2 as a special program from the above genres. In FIG. 8, the genres surrounded by solid lines indicate genres selected by the user. The genres surrounded by dot lines are genres not selected by the user.

When the 'drama' is selected at the setting screen S6, for example, as shown in FIG. 5, the special program of the 'hot drama' is included in the special program/keyword table screen S2 with high probability.

Figure 9:
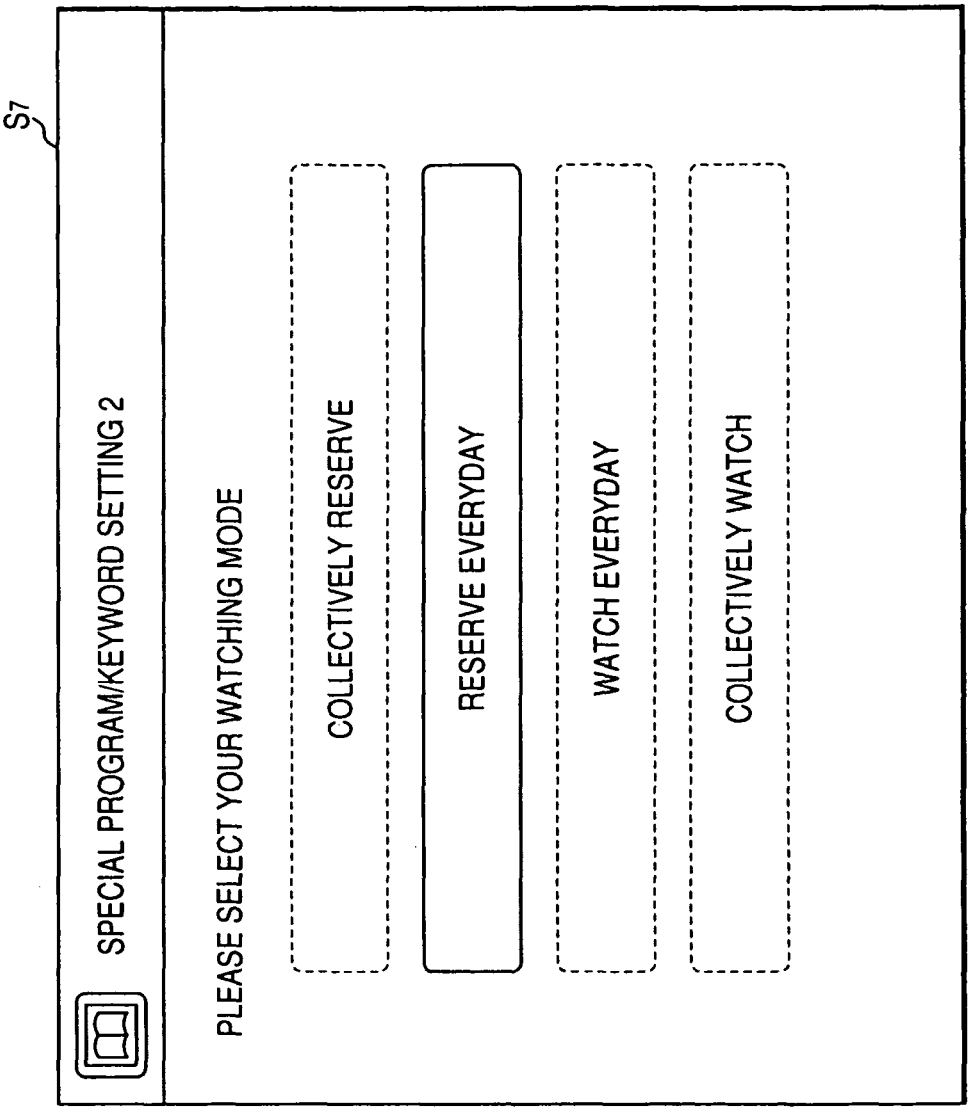
FIG. 9 is a view showing an example of a special program/keyword setting screen 2.

FIG. 9 is a view showing an example of the setting screen S7 of FIG. 2 displayed when an option is instructed from the special program/keyword table screen S2 of FIG. 5.

The setting screen S7 displays four watching modes such as 'collectively reserve', 'reserve everyday', 'watch everyday' and 'collectively watch' and the user can select a desired watching mode from the above four watching modes. In FIG. 9, the watching mode surrounded by solid lines indicates a watching mode selected by the user and the watching modes surrounded by dot lines indicate watching modes not selected by the user.

For example, when the 'collectively reserve' is selected, a program to be broadcasted as the special program is selected by focusing on programs, such as a program which will be over next week, that comparatively have an enough time until next broadcasting is selected, on the basis of a display time of the special program/keyword table screen S2.

For example, when the 'reserve everyday' is selected, a program to be broadcasted as the special program is selected by focusing on only programs, such as a program which will be over next day, that comparatively have not an enough time until next broadcasting is selected, on the basis of a display time of the special program/keyword table screen S2.

When the 'watch everyday' is selected, a recorded program as the special program is selected by focusing on only the programs, that a time does not elapse after finishing the record, such as a program which had been recorded from one day before to now (display time in the special program/keyword table screen S2), on the basis of a display time of the special program/keyword table screen S2.

When the 'collectively watch' is selected, a recorded program as the special program is selected by focusing on the programs, that a time elapses after finishing the record, such as a program which had been recorded from one week before to now (display time of the special program/keyword table screen S2), on the basis of a display time of the special program/keyword table screen S2.

Accordingly, the user can perform setting so as to select the special program from the programs that are proper to the watching mode of the user.

Next, configurations of the information processing device 1 for displaying the screens will be described.

Figure 10:
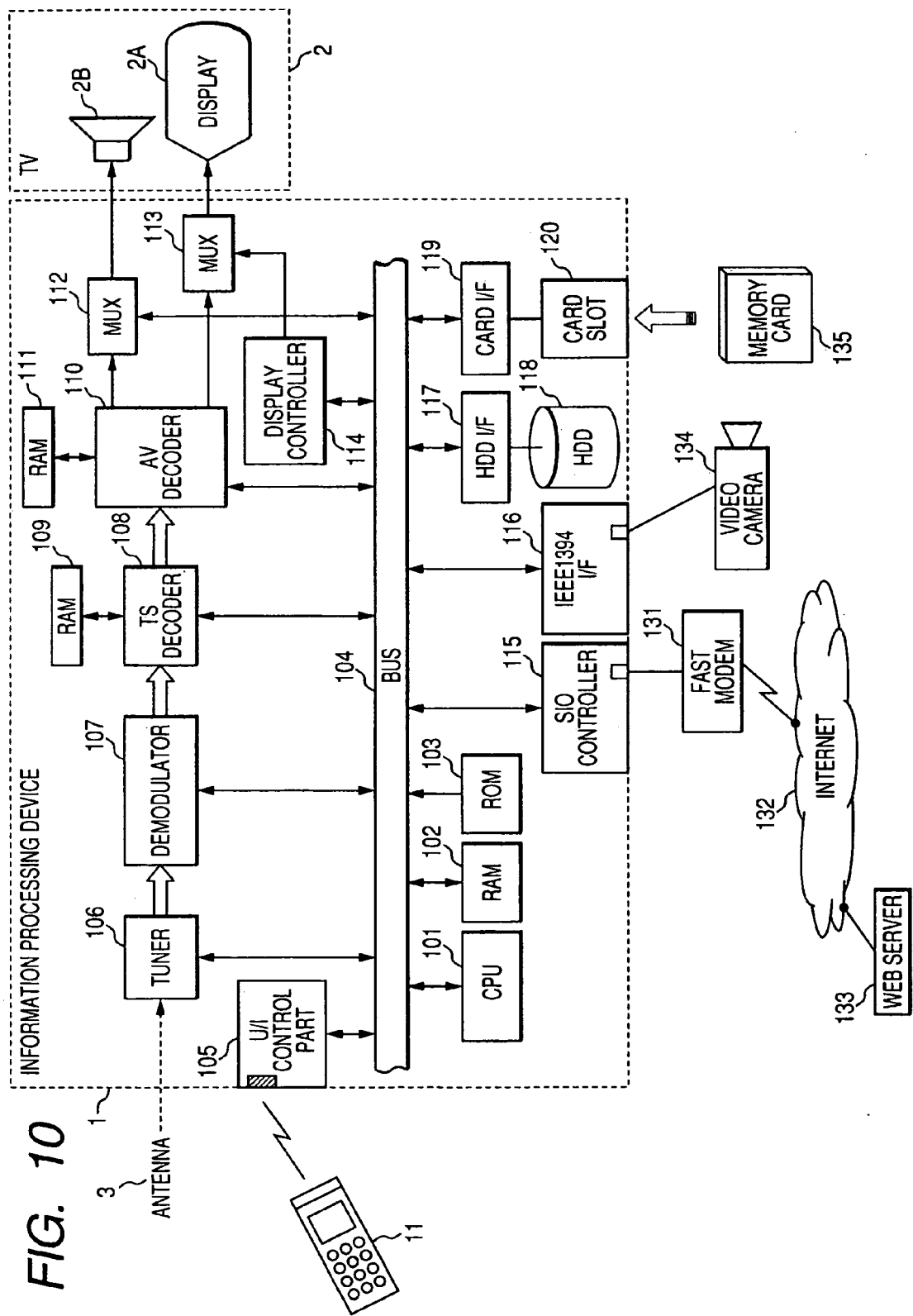
FIG. 10 is a block diagram showing an example of the configuration of hardware of the information processing device.

FIG. 10 is a block diagram showing an example of the configuration of hardware of the information processing device 1.

A CPU (central processing unit) 101 executes a program stored in a ROM (read only memory) 103, and a program loaded in a RAM (random access memory) 102 through an HDD I/F 117 and a bus 104 from an HDD 118. For example, the CPU 101 controls the operation of each unit according to an instruction (command from a remote controller 11) from the user received by a U/I control unit 105.

A tuner 106 receives a broadcasting signal from an antenna (not shown) and outputs the received broadcasting signal to a demodulator 107 in accordance with the control of the CPU 101.

The demodulator 107 demodulates the received broadcasting signal supplied from the tuner 106 and outputs a transport stream broadcasted from a predetermined channel to a TS decoder 108.

The TS decoder 108 extracts a predetermined stream from the transport stream supplied from the demodulator 107 by using a RAM 109 and outputs packets which form the extracted stream to the bus 104 or an AV decoder 110 in accordance with the control of the CPU 101. The packets (program data) supplied to the bus 104, for example, are supplied and recorded to the HDD 118 through the HDD I/F 117. In addition, the EPG acquired by the TS decoder 108 is properly supplied to and recorded in the HDD 118.

The AV decoder 110 decodes video data (video packet) and audio data (audio packet) supplied from the TS decoder 108 using a RAM 111 and outputs a decoded audio signal to a MUX 112 and a decoded video signal to the MUX 113, respectively.

The MUX 112 outputs a voice corresponding to the audio signal supplied from the AV decoder 110 from a speaker 2B of the TV 2.

The MUX 113 displays predetermined images (screens) on a display 2A of the TV 2 on the basis of the video signal supplied from the AV decoder 110 and a video signal (OSD (on screen display) signal) supplied from a display controller 114.

The display controller 114 generates a video signal so as to display a screen such as the special program/keyword table screen S2 of FIG. 5 on a display 2B and outputs the generated video signal to the MUX 113 in accordance with the control of the CPU 101.

An SIO (serial I/O) controller 115 accesses a web server 133 through the Internet 132 by controlling a fast modem 131 and downloads the EPG or the like according to necessity. The downloaded EPG is supplied to and stored in the HDD 118.

An IEEE (institute of electrical and electronics engineers) 1394 I/F 116 fetches video data from a video camera 134 connected through an IEEE1394 cable.

An HDD I/F 117 stores the data supplied through the bus 104 in the HDD 118 and supplies the data stored in the HDD 118 to each unit through the bus 104.

A card I/F 119 stores data supplied through the bus 104 in a memory card 135 mounted in a slot 120, or reads and outputs the data stored in the memory card 135 to the bus 104.

Figure 11:
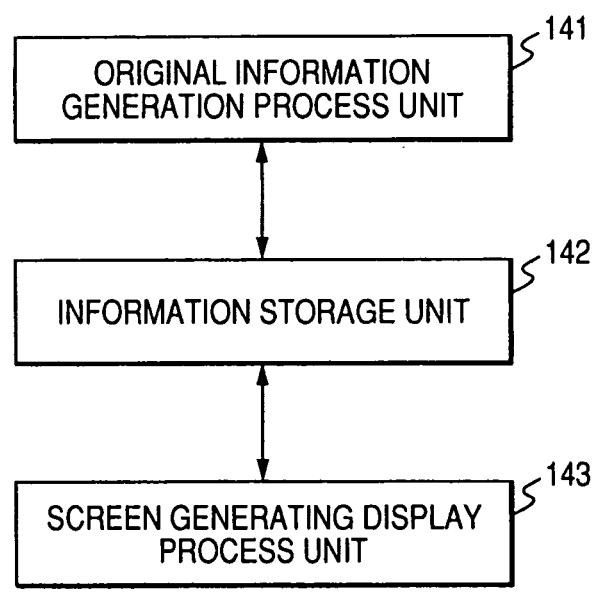
FIG. 11 is a block diagram showing an example of a functional configuration of the information processing device.

FIG. 11 is a block diagram showing an example of a functional configuration of the information processing device 1. At least a part among the functional units shown in FIG. 11 is implemented by executing a predetermined program by the CPU 101 of FIG. 10.

The information processing device 1 includes an original information generation process unit 141, an information storage unit 142, and a screen generating display process unit 143.

The original information generation process unit 141 generates information used when the screen generating display process unit 143 displays the special program/keyword table screen and stores the generated information in a predetermined storage unit in the information storage unit 142 and a database by weighting each information stored in the information storage unit 142.

The information storage unit 142 stores each of various information, such as program information, record reservation information set by the user, a thumbnail acquired from data of a recorded program, or the like.

The screen generating display process unit 143 generates data in order to display the special program/keyword table screen by using the information stored in the information storage unit 142 and display the special program/keyword table screen on the TV 2 on the basis of the generated data.

Figure 12:
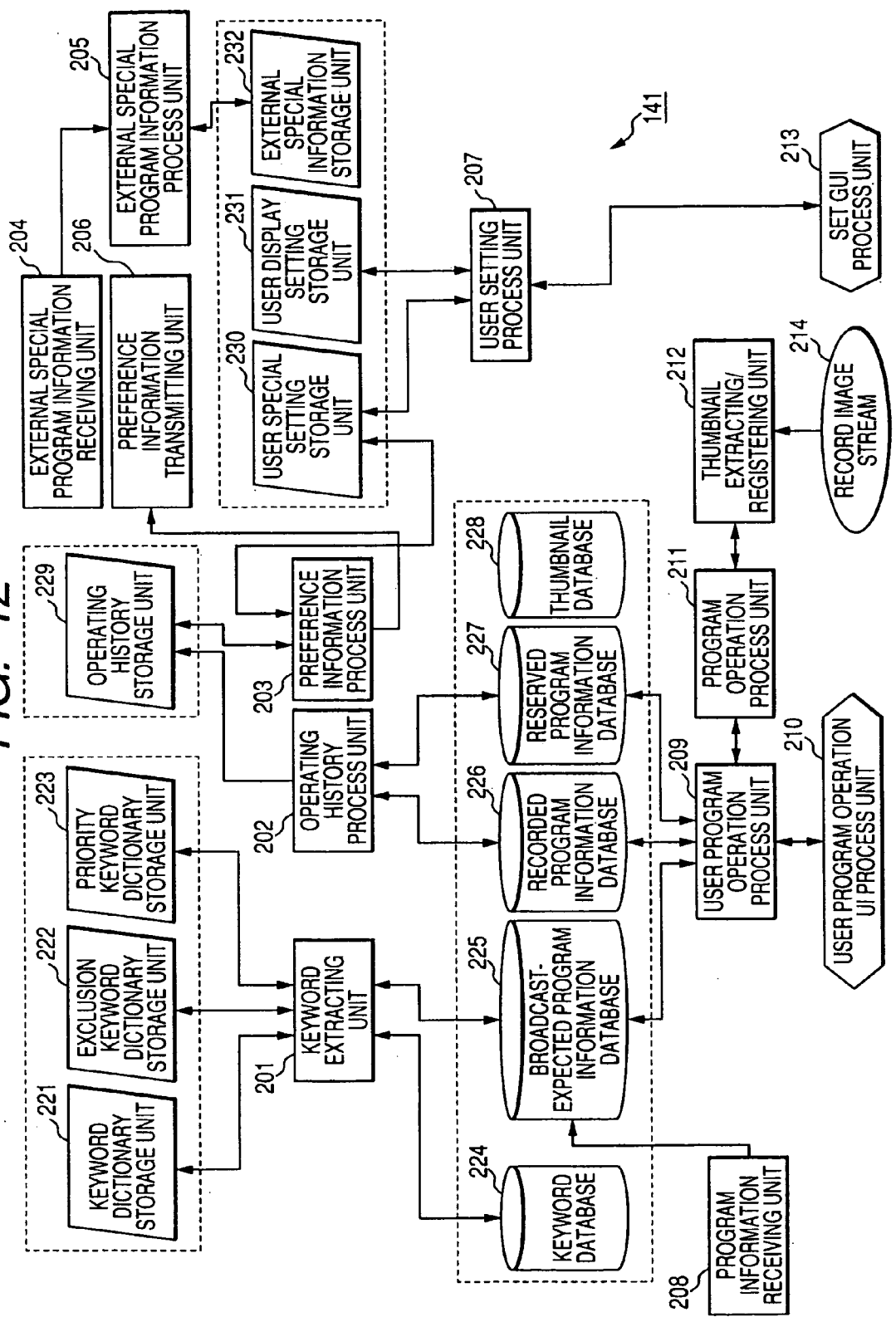
FIG. 12 is a block diagram showing an example of the configuration of the original information generating process unit of FIG. 11.

FIG. 12 is a block diagram showing an example of configuration of the original information generation process unit 141. In addition, a part of the configuration of the information storage unit 142 is shown in FIG. 12. In FIG. 12, the information storage unit 142 is surrounded by a dot line.

A keyword dictionary storage unit 221 stores a dictionary of words which may be keywords such as a name of a player at a program and a genre name of the program.

An exclusion keyword dictionary storage unit 222 stores a dictionary for excluding the words which can not be used in order to prevent words, which can not be used when selecting the special program or the like, from being extracted as keywords.

A priority keyword dictionary storage unit 223 stores a dictionary of words treated as a keyword having higher priority than other words.

A keyword database 224 stores keywords extracted by a keyword extracting unit 201. The keywords stored in the keyword database 224 are referred to by the screen generating display process unit 143 when generating ranking of the keywords.

The keyword database 224 stores a table where keyword IDs, keyword spelling (keyword), keyword attribute (name of person, name of place, name of organization, and the like), and program information of an extracting source of keywords (information such as a genre of a program, a broadcasting station, a broadcasting time, a new program/identification information of the final episode, the number of characters of program explanation, and the like) are associated with each other.

A broadcast-expected program information database 225 stores program information included in the EPG supplied from a program information receiving unit 208.

A recorded program information database 226 stores the program information of the recorded program. When a program is recorded, the user program operation process unit 209 reads from the broadcast-expected program information database 225 and supplies the program information of the corresponding program.

A reserved program information database 227 stores program information of the program that the record reservation is set. When the record reservation is set for a program, the user program operation process unit 209 reads and supplies the program information of the corresponding program from the broadcast-expected program information database 225.

In the broadcast-expected program information database 225, the recorded program information database 226, and the reserved program information database 227, table corresponding to the program information such as a program ID, a program name, a genre, a broadcasting station, a broadcasting time, a new program/identification information of the final episode, the number of characters of program explanation (outline), or the like is stored.

An operating history storage unit 229 stores operating history of the user supplied from an operating history process unit 202. The operating history storage unit 229 stores, for example, information such as program information of the program recorded according to the operation of the user.

A user special setting storage unit 230 stores, for example, the setting by the user such as a genre set in the setting screen S6 of FIG. 8.

A user display setting storage unit 231 stores, for example, the watching mode of the user set in the setting screen S7 of FIG. 9.

An external special information storage unit 232 stores information of the special program from the external. The information of the special program is acquired through a broadcasting wave or downloaded from the web server 133 of FIG. 10. For example, in the end of the year, information which instructs to generate special programs such as a two hour program, a three hour program, or the like is acquired as information of the special program from the external. As such, the information processing device 1 acquires information, such as the information of the special program that is not prepared in advanced, from the external according to the necessity.

The keyword extracting unit 201 refers to the dictionaries stored in the keyword dictionary storage unit 221, the exclusion keyword dictionary storage unit 222, and the priority keyword dictionary storage unit 223. Further, the keyword extracting unit 201 extracts a word which may be a keyword by selecting the special program or the like from the words included in the program information stored in the broadcast-expected program information database 225. The keyword extracting unit 201 stores the extracted word in a keyword database 224 with the program information from which the word is extracted.

The operating history process unit 202 refers to the operation contents of the user on the basis of the program information stored in the recorded program information database 226 and the reserved program information database 227. Further, the operating history process unit 202 stores information, which indicates the operation contents of the user such as information which indicates which program is recorded, in the operating history storage unit 229 as the operation history.

A preference information process unit 203 analyzes the preference of the user on the basis of the operating history stored in the operating history storage unit 229 and the setting stored in a user special setting storage unit 230, and outputs information indicating the preference of the user to a preference information transmitting unit 206.

An external special program information receiving unit 204 acquires the special program information from the external through the broadcasting wave or by downloading from the web server 133 and outputs the acquired special program information to an external special program information process unit 205.

The external special program information process unit 205 stores the special program information supplied from the external special program information receiving unit 204 in an external special information storage unit 232.

The preference information transmitting unit 206 transmits the preference information of the user, for example, to the web server 133 of FIG. 10.

A user setting process unit 207 stores the setting of the user in the user special setting storage unit 230 or the user display setting storage unit 231 on the basis of the information supplied from a set GUI process unit 213. The set GUI process unit 213 receives the setting of the user performed at the screen shown in FIG. 8 or 9 and outputs information indicating the received set content to the user setting process unit 207.

A program information receiving unit 208 acquires the EPG and stores the program information included in the EPG in the broadcast-expected program information database 225 through the broadcasting wave or by downloading from the web server 133.

When the user records the program, the user program operation process unit 209 reads the program information of the corresponding program from the broadcast-expected program information database 225 and stores the read program information in the recorded program information database 226. When the user reserves to record a program, the user program operation process unit 209 reads the program information of the corresponding program from the broadcast-expected program information database 225 and stores the read program information in the reserved program information database 227. Further, the user program operation process unit 209 outputs the program information read from the broadcast-expected program information database 225 to a program operation process unit 211.

A user program operation UI process unit 210 checks the operation contents by the user on the basis of the command, which is transmitted from the remote controller 11 and received in the U/I control unit 105 of FIG. 10, and outputs information indicating the operation contents to the user program operation process unit 209.

The program operation process unit 211 outputs the program information supplied from the user program operation process unit 209 to a thumbnail extracting/registering unit 212.

The thumbnail extracting/registering unit 212 identifies the recorded program and the record-reserved program and acquires the thumbnail of the identified program from the recorded program data (record image stream) on the basis of the program information supplied from the program operation process unit 211. The thumbnail acquired by the thumbnail extracting/registering unit 212 is registered in a thumbnail database 228 and used for being displayed in the special program/keyword table screen.

The set GUI process unit 213 receives the setting by the user performed on the setting screen shown in FIG. 8 or 9 and outputs information indicating the received setting contents to the user setting process unit 207.

FIG. 13 is a block diagram showing an example of the configuration of the screen generating display process unit 143. The constituent elements of FIG. 13 that is the same as those of FIG. 12 are denoted by the same reference numerals, and the descriptions thereof will be omitted in order to avoid the repeated description. Further, a part of the configuration of the information storage unit 142 is shown in FIG. 13. The information storage unit 142 is surrounded by a dot line in FIG. 13.

A keyword ranking condition storage unit 271 stores the keyword ranking conditions referred to when generating the keyword ranking.

According to the keyword ranking conditions, for example, it is instructed to generate the keyword ranking for the name of person or the keyword ranking for the name of place. In addition, when generating the ranking of the name of person in trend, for example, it is instructed to generate the keyword rank according to the name of the person who has a large number of appearing frequency in the programs as a player or the like by comparing it with the number acquired in the last week.

A special keyword searching condition storage unit 272 stores a special keyword searching condition referred to when searching the special program keyword (for example, a keyword 'Yukiko Nakata' included in the special program 'person of the today' in FIG. 5). The special keyword searching condition instructs, for example, to search words corresponding to the name of person or words corresponding to the name of place.

A priority added special keyword condition storage unit 273 stores the priority added special keyword condition referred to when setting up the priority to the special keyword. According to the priority added special keyword condition, a score added to the special keyword searched by being matched with the special keyword searching condition is determined. The score indicates the priority of each of the special keywords and the keyword having the highest priority, for example, 'Yukiko Nakata' in FIG. 5, is selected as the special keyword.

A special program searching condition storage unit 274 stores the special program searching condition referred to for searching the special program.

For example, the special program searching condition indicates to search the program whose genre is the 'drama'. In addition, when generating a special program for a new program (program started to be newly broadcasted), it is instructed to search a program including the program information indicating that the program is a new program. When generating a Christmas special, it is instructed to search a program including words such as 'Christmas', 'Santa', or 'present' in the outline of the corresponding program.

An expansion dictionary storage unit 275 stores an expansion dictionary referred to when searching the special program. The expansion dictionary includes supporting words when the words having the same meaning are written by different or wrong form, for example, 'Kida Tatsuya' is written by a different name 'Kida Tatuya', a common name 'Kidataku', a miswriting 'Kida Takuya', or an organization name 'Kida Quintet'.

A priority added special program condition storage unit 276 stores the priority added special program condition referred to when setting up the priority of the special program. According to the priority added special program condition, a score added to the program searched by being matched with the special program searching condition is determined. The determined score indicates the priority of each of the special programs and the special program having the highest priority, for example, the 'married couple' in FIG. 5, is selected as the special program displayed on the special program/keyword table screen.

A priority added special program condition storage unit 277 stores the priority added special program condition referred to when setting up the priority of the special.

For example, when the time displayed in the special program/keyword table screen is December first to twenty fifth according to the priority added special program condition, it is instructed that the 'Christmas' special has the highest priority. When it is the time to change the program organization, it is instructed that the 'new program' has the highest priority.

A display screen storage unit 278 stores data of the special program/keyword table screen generated by a display layout process unit 259.

A keyword ranking operating unit 251 generates the keyword ranking by arranging the keyword according to the number of the keyword stored in the keyword database 224 on the basis of the keyword ranking condition stored in the keyword ranking condition storage unit 271.

For example, when it is instructed to generate the keyword ranking by arranging names of the players according to the number of organizations registered as the player by the keyword ranking condition, the ranking is generated as shown in FIG. 7. The rank generated by the keyword ranking operating unit 251 is output to a special priority adding process unit 258.

A special keyword searching unit 252 searches a word matched with a special keyword searching condition stored in the special keyword searching condition storage unit 272 from the keyword (word) stored in the keyword database 224 and the word included in the program information stored in the broadcast-expected program information database 225, the recorded program information database 226, or the reserved program information database 227.

When it is instructed to search a word of the name of person according to the special keyword searching condition, for example, 'Yukiko Nakata', 'Takuya Kimura', or the like whose attribute of the keyword is the name of the person are acquired as the special keywords. In addition, when it is instructed to search a word of the name of place according to the special keyword searching condition, for example, 'Kyoto', 'Iraq', 'North Korea', or the like whose attribute of the keyword is the name of the place are acquired as the special keywords. When it is instructed to search a word of the name of organization according to the special keyword searching condition, for example, 'Sony' or the like whose attribute of the keyword is the name of the organization is acquired as the special keyword.

The special keyword acquired by a special keyword searching unit 252 is output to a special keyword priority adding process unit 253.

The special keyword priority adding process unit 253 adds a score to the special keyword supplied from the special keyword searching unit 252 on the basis of the priority added special keyword condition stored in the priority added special keyword condition storage unit 273, user preference information supplied from a preference information process unit 256, and a displaying date and time (displaying time) of the special program/keyword table screen supplied from a display date and time acquiring unit 257.

For example, when the preference information supplied from the preference information process unit 256 instructs that the user sets the 'drama' as a genre of the special program being displayed in the special program/keyword table screen, a score such as ten grades, nine grades, eight grades . . . is added according to a large number of special keywords extracted from the program information of the corresponding program of the 'drama' by the priority added special keyword condition.

In addition, according to the priority added special keyword condition, on the basis of the displaying day and time of the special program/keyword table screen, the score increases ten grades to the special keyword extracted from the program information of the program broadcasted for the last one day or the special keyword extracted from the program information of the program to be broadcasted in one day to come. Whenever one day is getting away from the displaying day and time of the special program/keyword table screen on the basis of the displaying day and time of the special program/keyword table screen, the score decreases two grades and the decreased score is added to the special keyword extracted from the program information of the corresponding program according to the priority added special keyword condition.

The special keyword priority adding process unit 253 outputs the score added special keyword to the special priority adding process unit 258.

A special program searching unit 254 refers to the expansion dictionary stored in the expansion dictionary storage unit 275 according to the necessity, and searches the program matched with the special program searching condition stored in the special program searching condition storage unit 274 from the information stored in the broadcast-expected program information database 225, the recorded program information database 226, and the reserved program information database 227.

For example, when the special program searching condition instructs to search the program whose genre is the 'drama', the special program searching unit 254 acquires a program whose genre is the 'drama' as the special program from the programs stored in the broadcast-expected program information database 225, the recorded program information database 226, and the reserved program information database 227.

The program information of the special program acquired by the special program searching unit 254 is output to a special program priority adding process unit 255.

The special program priority adding process unit 255 adds the score to the special program acquired by the special program searching unit 254 on the basis of the priority added special program condition stored in the priority added special program condition storage unit 276, the user preference information supplied from the preference information process unit 256, and a displaying date and time of the special program/keyword table screen supplied from the display date and time acquiring unit 257.

For example, when the number of the characters of the outline of the program is equal to or greater than ten, the priority added special program condition instructs to increase the score of ten grades to the special program. When the number of the characters of the outline of the program is equal to or smaller than ten, the priority added special program condition instructs to increase the score of zero grades to the special program.

In addition, in the case in which the broadcast starting time of the program is from 18:00 to 22:00, the score is increased by ten grades, and in the case in which the broadcast starting time of the program is from 07:00 to 18:00 or from 22:00 to 25:00, the score is increased by five grades according to the instruction of the priority added special program condition.

The special program priority adding process unit 255 outputs scored added information of the each of the special programs to the special priority adding process unit 258.

The preference information process unit 256 analyzes the preference of the user on the basis of the operating history stored in the operating history storage unit 229, the setup by the user stored in the user special program set up storage unit 230, and the information of the special program from the external stored in the external special information storage unit 232. The preference information process unit 256 outputs the information indicating the preference of the user to the special keyword priority adding process unit 253, the special program priority adding process unit 255, and the special priority adding process unit 258.

The display date and time acquiring unit 257 outputs the date and time for displaying the special program/keyword table screen to the special keyword priority adding process unit 253, the special program priority adding process unit 255, and the special priority adding process unit 258.

The special priority adding process unit 258 refers to the score added to each of the special keywords supplied from the special keyword priority adding process unit 253 and the score added to each of the special programs supplied from the special program priority adding process unit 255, and selects the predetermined number of special keywords to which higher score is added and the special of the special program.

For example, when the higher score is added to 'Yukiko Nakata' which is a special keyword supplied from the special keyword priority adding process unit 253, the special of 'person of the today' which is the special of the special keyword is selected as the special to be displayed on the special program/keyword table screen. In addition, when the higher score is added to 'married couple' which is a special program supplied from the special program priority adding process unit 255, the special of 'drama special' which is the special of the program is selected as the special to be displayed on the special program/keyword table screen (special program/keyword display region 41).

That is, the information processing device 1 has a plurality of conditions arranged in advance in order to generate the special of the program, and selects the special to be displayed on the special program/keyword table screen from the plurality of conditions.

Further, the special priority adding process unit 258 selects a priority added special condition stored in the priority added special program condition storage unit 277 or a special according to the setting stored in the user display setting storage unit 231. As described above, for example, when the displaying time in the special program/keyword table screen is from December first to twenty fifth, the priority added special program condition instructs to set 'Christmas' special to have the highest priority and select the 'Christmas' special as a special to be displayed on the special program/keyword table screen.

The special selected by the special priority adding process unit 258 and the information indicating the scores of each of the specials (scores added to the special keyword and the special program) are output to the display layout process unit 259. In addition, the information for displaying the special of the staple program such as the information of the keyword ranking acquired by the keyword ranking operating unit 251 or the like is output from the special priority adding process unit 258 to the display layout process unit 259.

The display layout process unit 259 acquires the information of the special program selected by the special priority adding process unit 258 from the keyword database 224 or the thumbnail database 228, and determines the display layout of each of the specials on the basis of the score of the special supplied from the special priority adding process unit 258 while including the information of the staple program.

For example, in order that the special having the high score is distinguished, fonts of the characters (sizes of the characters, character style of bold/italic, or the like), and color and alignment of the characters are determined for displaying the contents of the special program, the title of the special program or the like, and screen data is generated so as to display the special program/keyword table screen.

The screen data generated by the display layout process unit 259 is supplied to and stored in the display screen storage unit 278. The set GUI process unit 213 displays the special program/keyword table screen on the basis of the screen data stored in the display screen storage unit 278.

Next, the operation of the information processing device 1 will be described.

First, the screen display process of the information processing device 1 will be described with reference to a flowchart illustrated in FIG. 14.

In step S1, the CPU 101 determines whether the program information (EPG) is being acquired or not and waits until the EPG is not being acquired. The program information is repeatedly acquired with a predetermined cycle even when the power is turned off (waiting state). The program information receiving unit 208 (see FIG. 12) of the original information generation process unit 141 stores the acquired program information in the broadcast-expected program information database 225.

In step S1, when the CPU 101 determines that the program information (EPG) is not being acquired, the process proceeds to step S2 and determines whether it is instructed to turn on the power (supplying the power and releasing a wait state driven by the low power).

For example, when a power button of the remote controller 11 is pushed and it is determined that it is instructed to turn on the power in step S2, the CPU 101 proceeds to step S3 so as to generate the screen data. The details of the screen data generating process will be described with reference to a flowchart of FIG. 16.

When the screen data is generated, in step S4, the CPU 101 (the set GUI process unit 213 of the screen generating display process unit 143 (see FIG. 13)) displays the special program/keyword table screen on the TV 2 and repeatedly performs the processes from step S1.

In contrast, in step S2, when it is determined that it is not instructed to turn on the power, the process proceeds to step S5 and the CPU 101 determines whether it is selected to call the special program/keyword table screen (whether the operation for displaying the special program/keyword table screen is performed on the menu screen S1).

When it is determined that it is selected to call the special program/keyword table screen in step S5, the process proceeds to step S3, and the CPU 101 performs the screen data generating process. In addition, when it is determined that it is not selected to call the special program/keyword table screen in step S5, the process proceeds to step S1, and the CPU 101 performs the processes from step S1.

According to the above processes, when the user performs predetermined operations such as turning on the power or selecting icons in the menu screen S1, the screen data is generated and the special program/keyword table screen is displayed on the basis of the generated screen data.

Next, other screen display process of the information processing device 1 will be described with reference to a flowchart of FIG. 15.

In this process, the screen data is previously generated when it is instructed to turn on the power by the user or it is instructed to display the special program/keyword table screen from the menu screen S1 but the screen data is generated when the new program information is acquired or the setting by the user is updated, that is, before the user instructs to generate the screen data.

In step S11, the CPU 101 determines whether the program information is being acquired and waits until the CPU 101 determines that the program information is not being acquired.

In step S11, when the CPU 101 determines that the program information is not being acquired, the process proceeds to step S12 and the CPU 101 determines whether the new program information is acquired or not.

In step S12, when the CPU 101 determines that the new program information is acquired, the process proceeds to step S13 and the CPU 101 generates the screen data. The details of the screen data generating process will be described with reference to a flowchart of FIG. 16. In step S13, after the screen data generating process is performed, the process returns to step S11 and the processes after step S11 are repeatedly performed.

On the other hand, in step S12, if CPU 101 determines that the new program information is not acquired, the process proceeds to step S14 and the CPU 101 determines whether it is instructed to turn on the power or not.

In step S14, if the CPU 101 determines that it is instructed to turn on the power, the process proceeds to step S15 and the CPU 101 displays the special program/keyword table screen on the TV 2 on the basis of the screen data generated in advance. The process returns to step S11 and the processes after step S11 are repeatedly performed.

In step S14, if the CPU 101 determines that it is not instructed to turn on the power, the process proceeds to step S16 and the CPU 101 determines whether the user changes the setting in the screen shown in FIG. 8 or 9.

In step S16, if the CPU 101 determines that the user changes the setting, the process proceeds to step S13 and the CPU 101 performs a screen data generating process according to the changed setting.

In step S16, if the CPU 101 determines that the user does not change the setting, the process proceeds to step S17 and the CPU 101 determines whether it is selected to call the special program/keyword table screen.

In step S17, if the CPU 101 determines whether it is not selected to call the special program/keyword table screen, the processes after step S11 are repeatedly performed. On the other hand, if the CPU 101 determines whether it is selected to call the special program/keyword table screen, the processes proceeds to step S15 and the CPU 101 displays the special program/keyword table screen on the TV 2 on the basis of the generated screen data.

As described above, it is possible to generate the screen data with the newest program information included in the information processing device 1 at that time or the newest contents set by the user by generating the screen data when the new program information is acquired or the user changes the setting.

Next, the screen data generating process performed at step S3 of FIG. 14 or step S13 of FIG. 15 will be described with reference to a flowchart of FIG. 16.

In step S31, the special keyword searching unit 252 (see FIG. 13) of a screen generating display process unit 143 performs the special keyword searching process so as to search the word matched with the special keyword searching condition stored in the special keyword searching condition storage unit 272 and outputs the acquired special keyword to the special keyword priority adding process unit 253.

In step S32, the special keyword priority adding process unit 253 performs a special keyword condition/special keyword priority adding process which adds the score to the special keyword acquired by the special keyword searching unit 252 and outputs the score-added special keyword to the special priority adding process unit 258.

In step S33, the special program searching unit 254 performs a special program searching process so as to search the program matched with the special program searching condition stored in the special program searching condition storage unit 274, and outputs the acquired program information of the special program to the special program priority adding process unit 255.

In step S34, the special program priority adding process unit 255 performs a special program searching condition/special program priority adding process so as to add the score to the special program acquired by the special program searching unit 254 and outputs the score-added special program to the special priority adding process unit 258.

In step S35, the keyword ranking operating unit 251 performs a keyword ranking generating process so as to generate the keyword ranking on the basis of the keyword ranking condition stored in the keyword ranking condition storage unit 271 and outputs the generated keyword ranking information to the special priority adding process unit 258.

In step S36, the special priority adding process unit 258 properly refers to the priority-added special condition stored in the priority added special program condition storage unit 277 and performs the priority-added special process so as to add the priority to each of the specials (select a special displayed on the special program/keyword table screen) on the basis of the score added on the special keyword supplied from the special keyword priority adding process unit 253 and the score added to the special program supplied from the special program priority adding process unit 255. The special selected by the special priority adding process unit 258 and the information which indicates the scores each of the corresponding specials are output to the display layout process unit 259.

In step S37, the display layout process unit 259 generates the screen data by determining the layout of the special selected by the special priority adding process unit 258. In step S37, the display layout process unit 259 stores the generated screen data (display layout) in the display screen storage unit 278.

Figure 14:
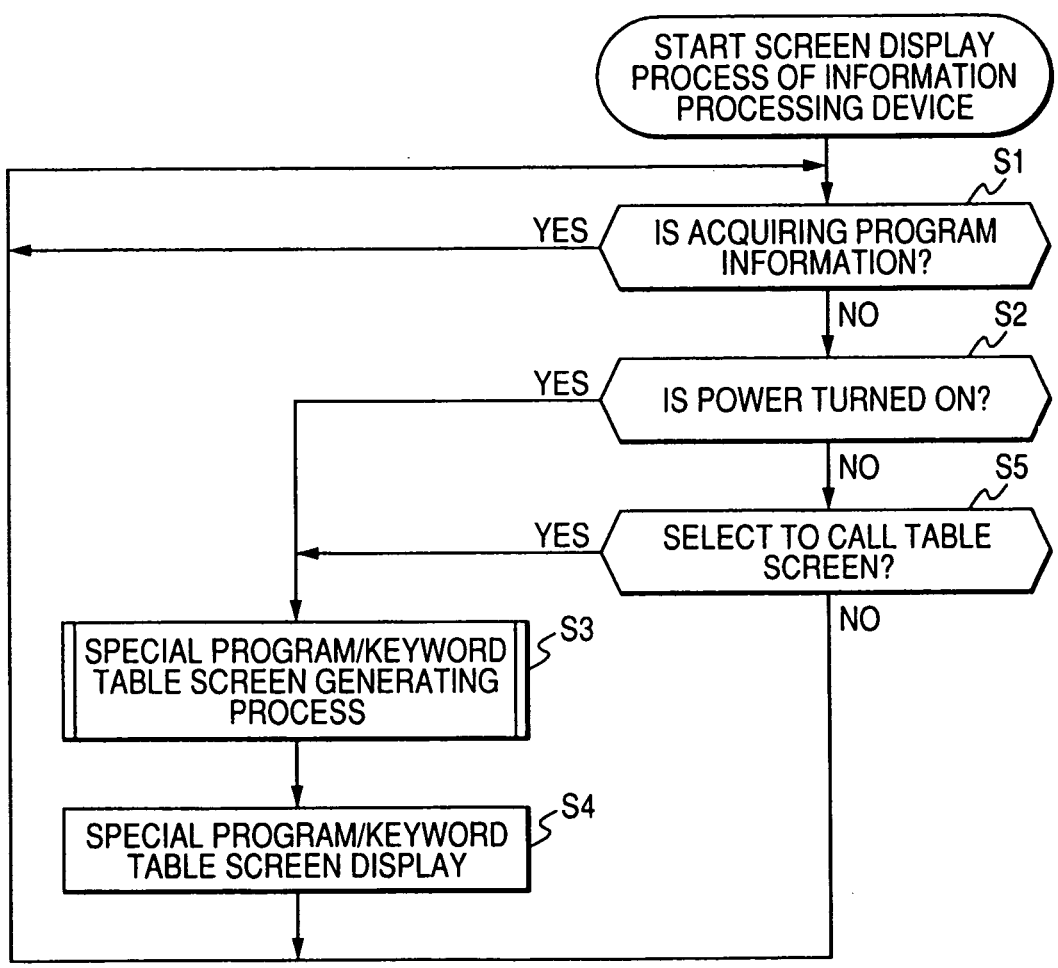
FIG. 14 is a flowchart illustrating a screen display process of the information processing device.
Figure 15:
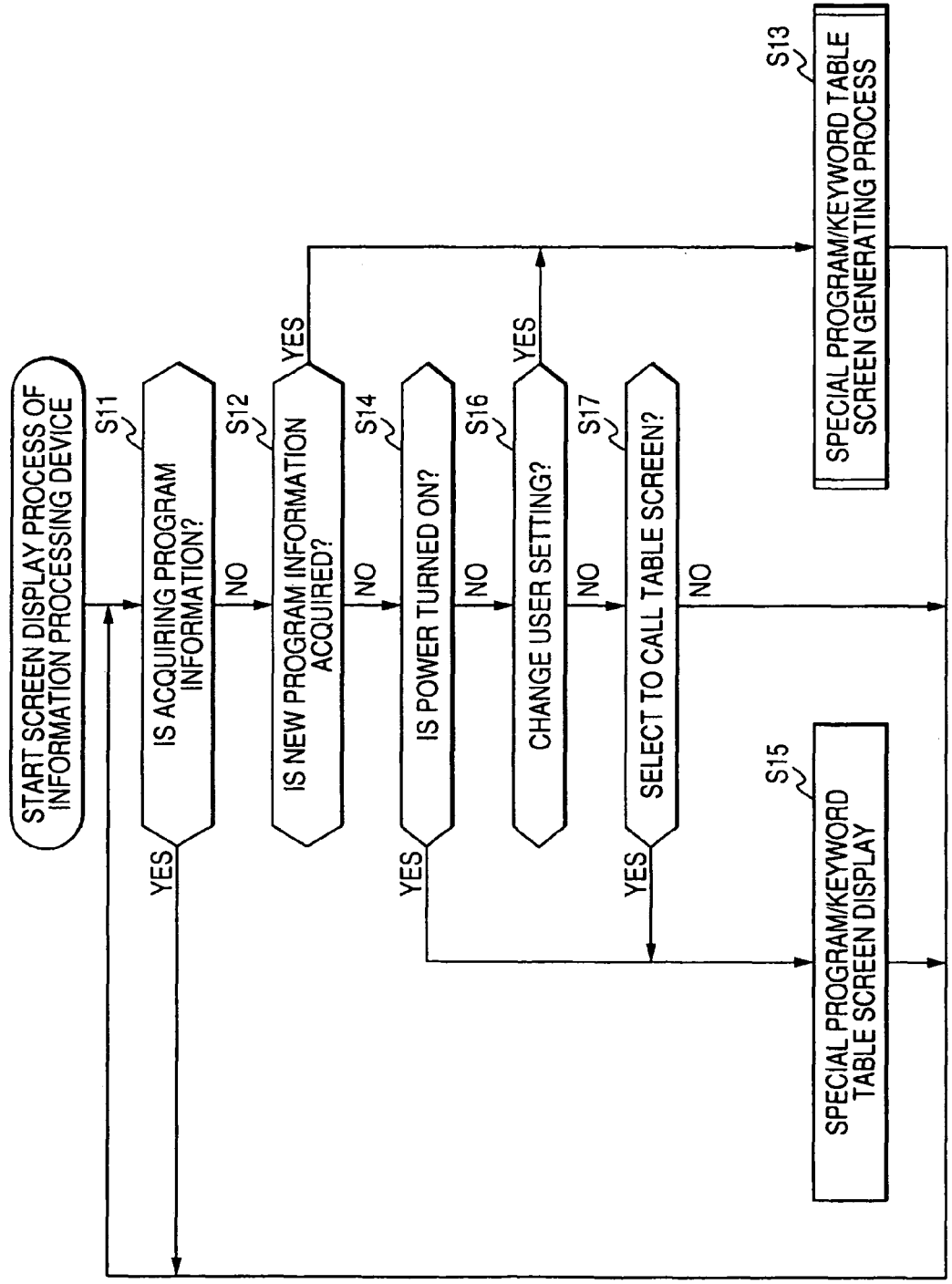
FIG. 15 is a flowchart illustrating other screen display process of the information processing device.
Figure 16:
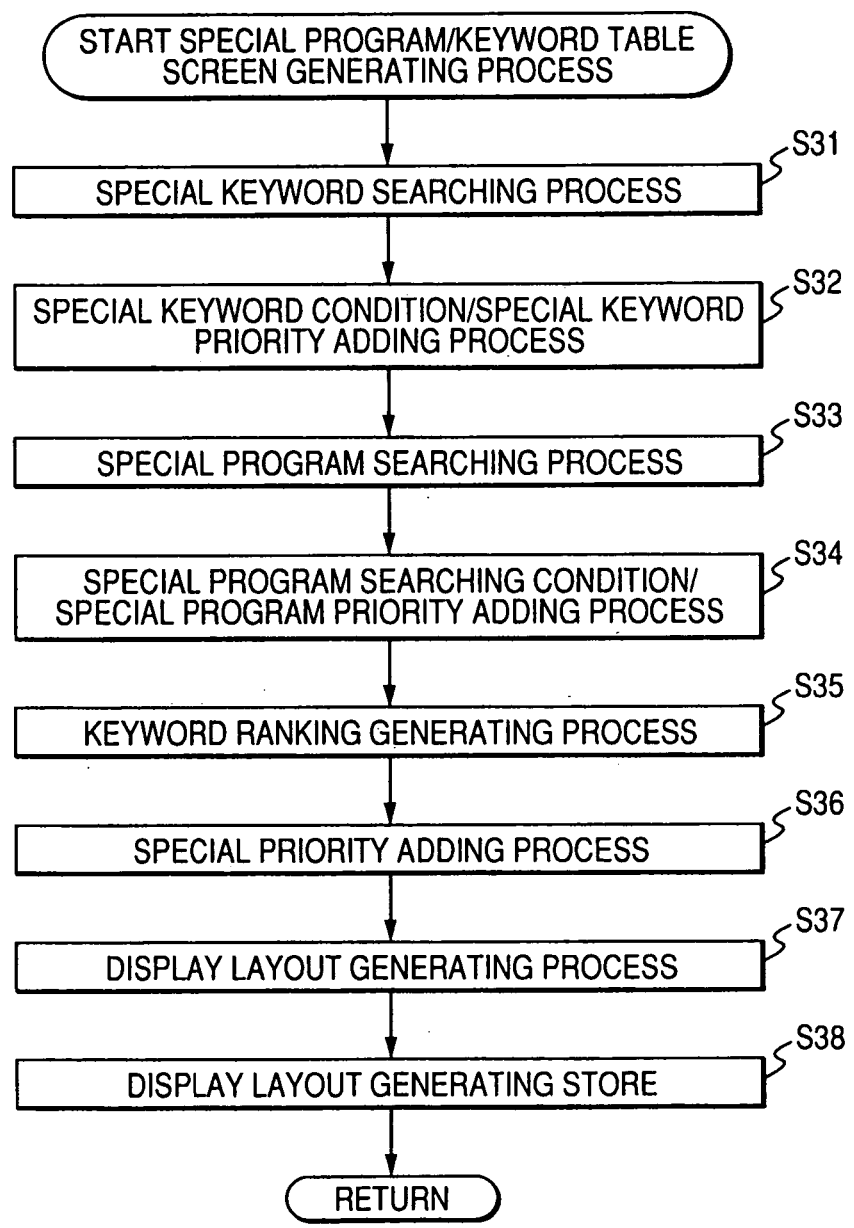
FIG. 16 is a flowchart illustrating a special program/keyword table screen generating process being performed in step S3 of FIG. 14 and step S13 of FIG. 15.

After step S37, the process returns to step S3 of FIG. 14 and step 13 of FIG. 15, and the processes after step S3 and step S13 are performed.

Until now, it has been described that the special program/keyword table screen shown in FIG. 5 is displayed by the information processing device 1 which is a digital recording medium, but the special program/keyword table screen may be displayed by a device which has not a recording function, for example, a TV receiver or the like. In this case, the broadcast-expected program is selected as a special program and the selected information of the corresponding program is displayed on the special program/keyword table screen on the basis of the program information included in the EPG.

In addition, the program included in the special programs is not limited to the broadcasting program and the program may be the contents (program) downloaded through the network or the contents capable of being watched by the streaming.

Further, until now, the special program is selected from the recorded program or the broadcast-expected program and the special keyword is selected from the selected program, but the special program may be selected from the program broadcasted in the past or the program information.

The series of processes can be executed not only by hardware but also software.

In the case in which the series of processes are executed by the software, a program forming the software is installed in a computer in which dedicated hardware is installed or the program consists of the software is installed in, for example, a general personal computer which can execute each of functions by installing programs through the network or a recording medium.

The recording medium may be configured not only by the card memory 135 shown in FIG. 10 recording a program distributed to supply the program to user, a magnetic disk (including a flexible disk), an optical-disk (CD-ROM (compact disk-read only memory), a DVD (including digital versatile disk), a magneto-optical disk (including MD (registered trademark) (mini-disk)), or the like in addition to the body of the device but also by the ROM 103 or HDD 118 which stores a program supplied from the user while being built in the body of the device.

In the present specification, each of the processes may be processed according to the written order and may be processed not the written order but in parallel or individually.

According to the embodiments of the invention, it is possible to provide the program selected on the basis of the predetermined theme.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, including a processor, the apparatus comprising:
    a generating unit that generates a special program by selecting a predetermined program among recorded programs and broadcast-expected programs to be acquired from broadcast on basis of a predetermined theme;
    a setting unit that sets priority to the special program generated by the generating unit,
    a display control unit that displays, on a special program screen, a plurality of contents of the recorded programs and broadcast-expected programs in an order in accordance with the priority set by the setting unit, and displays information of a plurality of particular programs, each of the plurality of particular programs corresponding to each of the plurality of contents, respectively, and having the highest priority among the recorded programs and broadcast-expected programs related to the corresponding content, and wherein the information of the particular program related to the selected program includes a transmitting time of the particular program which is a next broadcasting program to be broadcasted following the selected program on the basis of a predetermined broadcasting time of a series of programs including the selected program, the transmitting time of the particular program indicating when the particular program will be broadcasted.

2. The information processing apparatus according to claim 1, wherein the generating unit generates the special program on the basis of the theme selected from a plurality of themes prepared in advance.

3. The information processing apparatus according to claim 2, wherein the generating unit selects a desired theme on basis of at least one of a preference of a user, a time for displaying, the special program screen, or setting by the user.

4. The information processing apparatus according to claim 1, wherein the setting unit sets a priority to the special program on basis of at least one of a preference of a user or a time for displaying the special program screen.

5. The information processing apparatus according to claim 1, wherein the display control unit displays contents of the special program and information of the special program by changing fonts, colors, and sizes of characters in accordance with the priority set by the setting unit.

6. The information processing apparatus according to claim 1, wherein the display control unit displays a title of the special program by using characters and displays a program image acquired from data of the recorded programs near the characters when displaying information of the recorded programs as information of the special program.

7. The information processing apparatus according to claim 1, wherein the display control unit displays a title of the broadcast-expected program next by using characters and displays a program image acquired from data of the recorded programs among program series near the characters when displaying program information to be received next among the programs series received with a predetermined cycle on basis of a time for displaying the special program screen.

8. The information processing apparatus according to claim 1, wherein the generating unit changes a theme which is a source of the special program with a predetermined cycle and generates the special program.

9. The information processing apparatus according to claim 1, wherein the display control unit displays the special program screen when it is instructed to apply a power.

10. A method of processing information comprising the steps of:

generating a special program by selecting a predetermined program among recorded programs and broadcast-expected programs to be acquired from broadcast on basis of a predetermined theme;

setting priority to the generated special program, displaying, on a special program screen, a plurality of contents of the recorded programs and broadcast-expected programs in an order in accordance with the priority, and displaying information of a plurality of particular programs, each of the plurality of particular programs corresponding to each of the plurality of contents, respectively, and having the highest priority among the recorded programs and broadcast-expected programs related to the corresponding content, wherein the information of the particular program related to the selected program includes a transmitting time of the particular program which is a next broadcasting program to be broadcasted following the selected program on the basis of a predetermined broadcasting time of a series of programs including the selected program, the transmitting time of the particular program indicating when the particular program will be broadcasted.

11. A non-transitory computer-readable medium storing a program that when executed on a computer causes information processing, the program comprising the steps of:

generating a special program by selecting a predetermined program among recorded programs and broadcast-expected programs to be acquired from broadcast on basis of a predetermined theme;

setting priority to the generated special program, displaying, on a special program screen, a plurality of contents of the recorded programs and broadcast-expected programs in an order in accordance with the priority, and displaying information of a plurality of particular programs, each of the plurality of particular programs corresponding to each of the plurality of contents, respectively, and having the highest priority among the recorded programs and broadcast-expected programs related to the corresponding content, wherein the information of the particular program related to the selected program includes a transmitting time of the particular program which is a next broadcasting program to be broadcasted following the selected program on the basis of a predetermined broadcasting time of a series of programs including the selected program, the transmitting time of the particular program indicating when the particular program will be broadcasted.

* * * * *